(12) United States Patent
Sakurai et al.

(10) Patent No.: US 6,340,247 B1
(45) Date of Patent: Jan. 22, 2002

(54) FERRULE FOR OPTICAL CONNECTOR, MOLD FOR FERRULE, METHOD OF MANUFACTURING FERRULE FOR OPTICAL CONNECTOR, AND METHOD OF TESTING FERRULE FOR OPTICAL CONNECTOR

(75) Inventors: Wataru Sakurai; Hiroshi Katsura; Toshiaki Kakii; Masahiro Shibata, all of Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/509,953
(22) PCT Filed: Aug. 6, 1999
(86) PCT No.: PCT/JP99/04279
   § 371 Date: Jun. 7, 2000
   § 102(e) Date: Jun. 7, 2000
(87) PCT Pub. No.: WO00/08504
   PCT Pub. Date: Feb. 17, 2000

(30) Foreign Application Priority Data

Aug. 7, 1998 (JP) .......................................... 10-225009

(51) Int. Cl.$^7$ ................................................ G02B 6/36
(52) U.S. Cl. ........................ 385/78; 385/60; 385/71; 385/83
(58) Field of Search .............................. 385/59, 60, 65, 385/71, 72, 78, 83

(56) References Cited

U.S. PATENT DOCUMENTS

| 4,983,012 A | * | 1/1991 | Saito et al. ............. 350/96.21 |
| 5,619,605 A | * | 4/1997 | Ueda et al. ................. 385/80 |
| 5,949,937 A | * | 9/1999 | Honjo et al. ................ 385/59 |
| 6,007,257 A | * | 12/1999 | Ogawa et al. ............... 385/80 |
| 6,074,577 A | * | 6/2000 | Katsura et al. ........... 264/1.25 |
| 6,287,017 B1 | * | 9/2001 | Katsura et al. .............. 385/59 |

FOREIGN PATENT DOCUMENTS

| JP | 6-138344 | 5/1994 |
| JP | 6-148029 | 5/1994 |
| JP | 6-299072 | 10/1994 |
| JP | 8-50221 | 2/1996 |
| JP | 8-338925 | 12/1996 |
| JP | 9-193161 | 7/1997 |

* cited by examiner

Primary Examiner—John D. Lee
Assistant Examiner—Jennifer Doan
(74) Attorney, Agent, or Firm—McDermott, Will & Emery

(57) ABSTRACT

An optical connector ferrule 1A is mounted on the distal end of a fiber optic ribbon cable 2 to form an optical connector Ca. A mating surface 11 of the optical connector Ca opposes an optical connector Cb to be mated. Fiber accommodating holes 13 are formed in the mating surface 11 so as to accommodate optical fibers, and a pair of guide projections 10 are formed on the mating surface 11 so as to be positioned with the optical connector Cb. The ferrule 1A is integrally molded with a resin. This provides an optical connector ferrule allowing the easy manufacturing of an optical connector with good transmission performance.

14 Claims, 17 Drawing Sheets

FERRULE FOR OPTICAL CONNECTOR, MOLD FOR FERRULE, METHOD OF MANUFACTURING FERRULE FOR OPTICAL CONNECTOR, AND METHOD OF TESTING FERRULE FOR OPTICAL CONNECTOR

TECHNICAL FIELD

The present invention relates to an optical connector ferrule serving as a component of an optical connector and used for connection of a fiber optic ribbon cable, a mold for molding a ferrule, a method of manufacturing an optical connector ferrule, and a method of inspecting an optical connector ferrule.

BACKGROUND ART

FIGS. 18 and 19 show a pair of optical connectors Cg called MT connectors. Each optical connector Cg has an optical connector ferrule 81B and fiber optic ribbon cable 82. The ferrule 81B is made of a molding resin and mounted on an end of the fiber optic ribbon cable 82. The ferrule 81B has a pair of guide holes 92 and fiber positioning holes 93. The openings of the pair of guide holes 92 and fiber positioning holes 93 appear on an end face 91 opposing the optical connector Cg to be connected. The respective optical fibers, contained in the fiber optic ribbon cable 82, are arranged in the fiber positioning hole 93. The pair of guide holes 92 extend through the ferrule 81B from the one end face 91 to the other end face opposing the one end face. A stainless guide pin 83 is inserted into each of the pair of holes 92. As shown in FIG. 19, the guide pins are inserted into the guide holes 92 and positioned therein, whereby the pair of optical connectors Cg are connected to each other. This connection is held using a clamp spring 85. JIS C5981 provides detailed description of this optical connector type.

DISCLOSURE OF THE INVENTION

The present inventor found the following problems in the course of studying these optical connectors.

Each optical connector Cg has the guide pins 83 and resin ferrule 81B. Since the thermal expansion coefficient of the guide pins 83 is different from that of the ferrule 81B, temperature change causes stresses between the guide pins 83 and guide holes 92. Owing to these stresses, the positions of the optical fibers held in one optical connector Cg may shift from the positions of the optical fibers held in the other optical connector Cg. The inventor thinks that such shifts increase connection loss between these connectors.

Japanese Patent Laid-Open No. 6-138344 discloses a technique associated with an optical connector. This optical connector includes two different types of guide members in a resin ferrule. One of these types of guide member includes fiber fixing grooves for fixing optical fibers and guide projections. The other of these types of guide members includes fiber fixing grooves for fixing optical fibers and guiding depressions. Each of guide members is integrally formed with an Invar alloy. Each fiber fixing groove has a rectangular cross-section with a bottom and two sides. Each guide projection has a rectangular cross-section. The guiding depressions guide the guide projections inserted thereto with the two opposite sides of the guiding depressions.

The inventor paid attention to the following point in the course of studying the optical connector disclosed in the above reference.

Since each fiber fixing groove has a bottom surface and two sides, the fixed optical fiber is surrounded by three surfaces of the Invar alloy and one surface made of material different from Invar Alloy. The guiding depressions guide the inserted guide projections by the two opposing side surfaces thereof. For this reason, each guide projection is surrounded by the two surfaces made of one material and the two surfaces made of another material. The optical fibers, guide projections, and guiding depression is accommodated in the connector are surrounded in a plurality of kinds of materials. With temperature changes, various thermal stresses, dependent on the materials they contact, are applied to these accommodated components. The inventor thinks that the thermal stresses may interfere with higher-speed transmission.

It is, therefore, an object of the present invention to provide an optical connector ferrule that allows the formation of an optical connector having good transmission performance, a mold available for the formation of the ferrule, a method of manufacturing the ferrule, and a method of inspecting the ferrule.

An optical connector ferrule according to the present invention comprises one or more optical fiber accommodating holes, a mating surface, a first guide projection, and a guide engaging portion. Each of the optical fiber accommodating holes has an inner surface and one end portion. The inner surface is made of resin and extends along a predetermined axis. The inner surface are provided so as to face the side surface of the optical fiber when an optical fiber is inserted into one of the optical fiber accommodating holes. The openings of the optical fiber accommodating holes appear in the mating surface. The first guide projection and guide engaging portion continuously extend from the mating surface along the predetermined axis so as to be allowed to position the connector with another connector to be connected. The optical fiber accommodating holes, mating surface, first guide projection, and guide engaging portion are made of one piece molded resin.

Since the optical fiber accommodating holes, first guide projection, and guide engaging portion are formed into an integral component with resin, there is no need to use any positioning components made of different materials, e.g., metal guide pins. Since no additional positioning components are required, stresses due to temperature changes do not concentrate on any specific part of the ferrule. In addition, since the stresses are dispersed throughout the ferrule through the integral resin, deformation due to such stresses does not occur in only specific part of the ferrule. This reduces the positional offsets of the optical fiber accommodating holes due to temperature changes. This improves the positioning precision between the ferrules of a pair of connectors to be connected to each other.

In the ferrule according to the present invention, each optical fiber accommodating hole can be formed between the first guide projection and guide engaging portion. This facilitates inspecting the positions of the optical fiber accommodating holes. In addition, since the guide projection and guide engaging portion are disposed so as to sandwich the optical fiber accommodating holes, this can compensate on positional offset due to the deformation of the guide projection and guide engaging portion. The guide engaging portion may be a second guide projection or guide hole.

In the ferrule according to the present invention, the guide engaging portion can include a second guide projection, made of resin, continuously extending from the mating surface along the predetermined axis. Both the first and second guide projections, made of the same material, continuously extend from the mating surface along the predetermined axis. This further improves the positioning precision of optical fiber accommodating holes which is affected by temperature changes.

In the ferrule according to the present invention, each of the first and second guide projections has a cross-sectional area of the proximal portion gradually increasing toward the mating surface along the predetermined axis. As the cross-sectional area increases, the mechanical strength is enhanced in the proximal portion of each guide projection on which forces tend to concentrate in the attachment/detachment of the ferrule.

In the ferrule according to the present invention, each of the first and second guide projections has a circular cross-section taken on a plane intersecting the predetermined axis. The high symmetry of the cross-sectional shape is advantageous to keep the linearity of the projection even when the guide projection is made of resin. This further improves the positioning precision of the optical fiber accommodating holes.

In the ferrule according to the present invention, the guide engaging portion can include a guide hole with an inner surface made of resin extending along the predetermined axis, and a bottom surface made of resin.

Since the ferrule has a guide projection and guide hole that extend along the predetermined axis, these ferrules can be applied to a pair of connectors to be connected to each other. That is, the guide projection of one ferrule is inserted into the guide hole of the other ferrule. Since the guide projection is inserted into the guide hole made of the same material, temperature change deforms the guide projection and guide hole in the same manner. This improves the positioning precision of the optical fiber accommodating holes.

In the ferrule according to the present invention, the first guide projection has a cross-sectional area, in the proximal portion, gradually increasing toward the mating surface along the predetermined axis. In addition, in the ferrule according to the present invention, the first guide projection has a circular cross-section defined on a plane intersecting the predetermined axis.

In the ferrule according to the present invention, the inner surface of the guide hole can include a first tapered surface, which extends along the predetermined axis and tilts with respect to the side surface thereof, around the opening portion of the guide projection. The first tapered surface allows the guide projection to be smoothly inserted into the guide hole.

In the ferrule according to the present invention, the guide hole has a circular cross-section on a plane intersecting the predetermined axis. Since the guide hole has the high geometrical symmetry of the cross-section, high positioning precision can be maintained even if the guide hole thermally expands or shrink.

In the ferrule according to the present invention, the first guide projection has a second tapered surface, which tilts with respect to the predetermined axis, on the distal end portion. This facilitates the positioning of the guide projection to the guide hole into which the guide projection is inserted.

In the ferrule according to the present invention, the inner surface of the guide hole can include a third tapered surface, which extends along the predetermined axis and tilts with respect to the inner surface, around the opening portion thereof. The first guide projection can include a fourth tapered surface, which tilts with respect to the predetermined axis, on the distal end portion thereof. The third tapered surface is tilted in an angle associated with that of the fourth tapered surface.

The fourth tapered surface can increase the mechanical strength of the proximal end portion of the guide projection. The third tapered surface ensures that the guide hole accommodates the reinforced guide projection. Since the fourth tapered surface of the guide projection is made of the same material as the third tapered surface of the guide hole receiving the guide projection, the guide projection and guide hole deform similarly near the mating surface due to thermal expansion/shrinkage. This behavior improves the positioning precision of each optical fiber accommodating hole.

The ferrule can be molded using injection molding. This method shortens the molding cycle time and hence can improve productivity.

In the ferrule according to the present invention, the resin material for integrally forming this ferrule preferably includes a PPS resin containing 39 to 65 wt % of silica particle filler and 26 to 35 wt % of silicate whisker filler, with the total content of the silica particle filler and silicate whisker filler being 65 to 85 wt %.

The use of this resin allows higher dimensional accuracy and mechanical strength of molded products and can decrease the dimensional variations of the molded products with time. When a thermoplastic resin is used, a good releasability from a mold is provided, and damage to the guide projection may sustain can be suppressed in a releasing process.

A mold for molding the ferrule according to the present invention comprises first, second, third, and fourth mold units for defining a cavity for forming the ferrule. When the first unit is positioned to the second mold unit so as to define the cavity, a housing portion is provided. In the housing portion, the third and fourth mold units are accommodated. The third and fourth mold units are moved along the predetermined axis so as to be housed in the housing portion. The third and fourth mold units can be moved relative to the combined first and second mold units.

In the mold for molding the ferrule according to the present invention, the third mold unit has a guide projection forming portion, at least one pin, and an engaging portion forming portion. The guide projection forming portion has an inner surface extending along the predetermined axis and a bottom surface so as to form a guide projection of the ferrule. The pin extends along the predetermined axis so as to forming a fiber accommodating portion of the ferrule. The engaging portion forming portion extends along the predetermined axis so as to form an engaging portion of the ferrule. The pin of the third mold unit has a distal end portion on which a tapered portion is formed.

In the mold for molding the ferrule according to the present invention, the third mold unit has a pair of guide projection forming portions and one or more of pins. These pins can be arranged between the pair of guide projection forming portions.

In the mold for molding the ferrule according to the present invention, the third mold unit has a guide projection forming portion, a projection, and one or more of pins. The projection has a side surface extending along the predetermined axis to provide a guide hole of the ferrule. These pins can be arranged between the guide projection forming portion and the projection.

Since this mold comprises the first, second, third, and fourth mold units for defining the cavity for forming a ferrule, the ferrule can be integrally molded with the resin.

Therefore, the optical connector ferrule having the advantages above can be easily and reliably manufactured.

The third and fourth mold units can be moved relative to the first and second mold units along the predetermined axis. This allows the manufacturing of a ferrule having a guide engaging portion, guide projection, and guide hole which can be accurately positioned to a ferrule accommodating hole.

In the mold for molding the ferrule according to the present invention, the third mold unit has a vent extending from at least one of the bottom and inner surfaces of the guide projection forming portion to the surface of the third mold unit. This vent serves as a gas releasing hole when a molten resin flows into the guide projection forming portion, and hence allows the resin to easily flow into the guide projection forming portion. Since the resin flows toward the bottom surface, the vent is preferably formed in the bottom surface. To effectively release a gas while preventing leakage of the resin flow, the diameter of the vent is preferably set to 0.1 mm or more and 0.2 mm or less.

The inner surface and bottom portion of the guide projection forming portion can be coated with chromium nitride. This chromium nitride coating improves the releasability for the projection forming portion when the molded ferrule is released, and hence is effective in suppressing damage to the guide projection in the releasing process. Even if the guide projection is free from damage, the coating is useful in keeping the high dimensional accuracy of the guide projection. This allows the manufacturing of the ferrules that realize good transmission characteristics.

A method of suitably manufacturing the optical connector ferrule according to the present invention comprises the following steps: (1) preparing a mold disclosed in the specification; (2) providing a molding resin into a mold to form a ferrule; and (3) inspecting the positions of fiber accommodating holes of the ferrule with respect to guide projections or guide holes thereof, and separating a resin molded product that has passed the inspection and a resin molded product that have failed to pass the inspection.

The following inspection method can be applied to the method of manufacturing a ferrule.

The method of inspecting the optical connector ferrule according to the present invention allows the inspection of the positions of the fiber accommodating holes with respect to those of the guide projections in the ferrule.

This method comprises the following steps: (4) preparing a jig having a pair of positioning holes, the positioning holes extending through the jig from a first surface to a second surface, first and second guide projections are inserted into the pair of positioning holes; (5) receiving light passing through the pair of positioning hole of the jig to determine the positions of positioning holes on the basis of the received light; (6) inserting the first and second guide projections into the positioning holes; (7) receiving light passing through fiber accommodating holes to determine the positions of the fiber accommodating holes on the basis of the received light; and (8) inspecting the positions of the fiber accommodating holes with resect to the pair of guide projections on the basis of the determined positions of the positioning hole and the fiber accommodating holes.

A method of inspecting an optical connector ferrule according to the present invention comprises the following steps: (9) preparing a first jig having a pair of positioning holes provided so as to insert first guide projections therein and extending through the jig from a first surface thereof to a second surface thereof; (10) receiving light passing through the pair of positioning holes of the first jig to determine the positions of the positioning holes of the first jig; (11) preparing a second jig having a positioning projection provided so as to be inserted into the first guide hole, and inserting the positioning projection of the second jig into one of the pair of positioning holes; (12) inserting the guide projection of the ferrule into the other positioning hole, and inserting the positioning projection into the guide hole of the ferrule; (13) receiving light passing through fiber accommodating holes to determine the positions of the fiber accommodating holes on the basis of the received light; and (14) inspecting the positions of the fiber accommodating holes with respect to those of the pair of guide projections in accordance with the determined positions of the positioning hole and the fiber accommodating holes.

A jig having positioning holes positioned to guide projections is prepared. The positions of the positioning hole and the optical fiber accommodating holes are optically measured. The position data for one of the positioning hole and fiber accommodating holes is used as a reference to determine the other position. With this operation, in the ferrule of an integral resin body including guide projections and guide holes, the positions of the fiber accommodating holes with respect to the guide projections and guide holes can be accurately inspected.

BRIEF DESCRIPTION OF THE DRAWINGS

The embodiments of the present invention will be described as examples with reference to the accompanying drawings.

BEST MODE OF CARRYING OUT THE INVENTION

Figure 1:
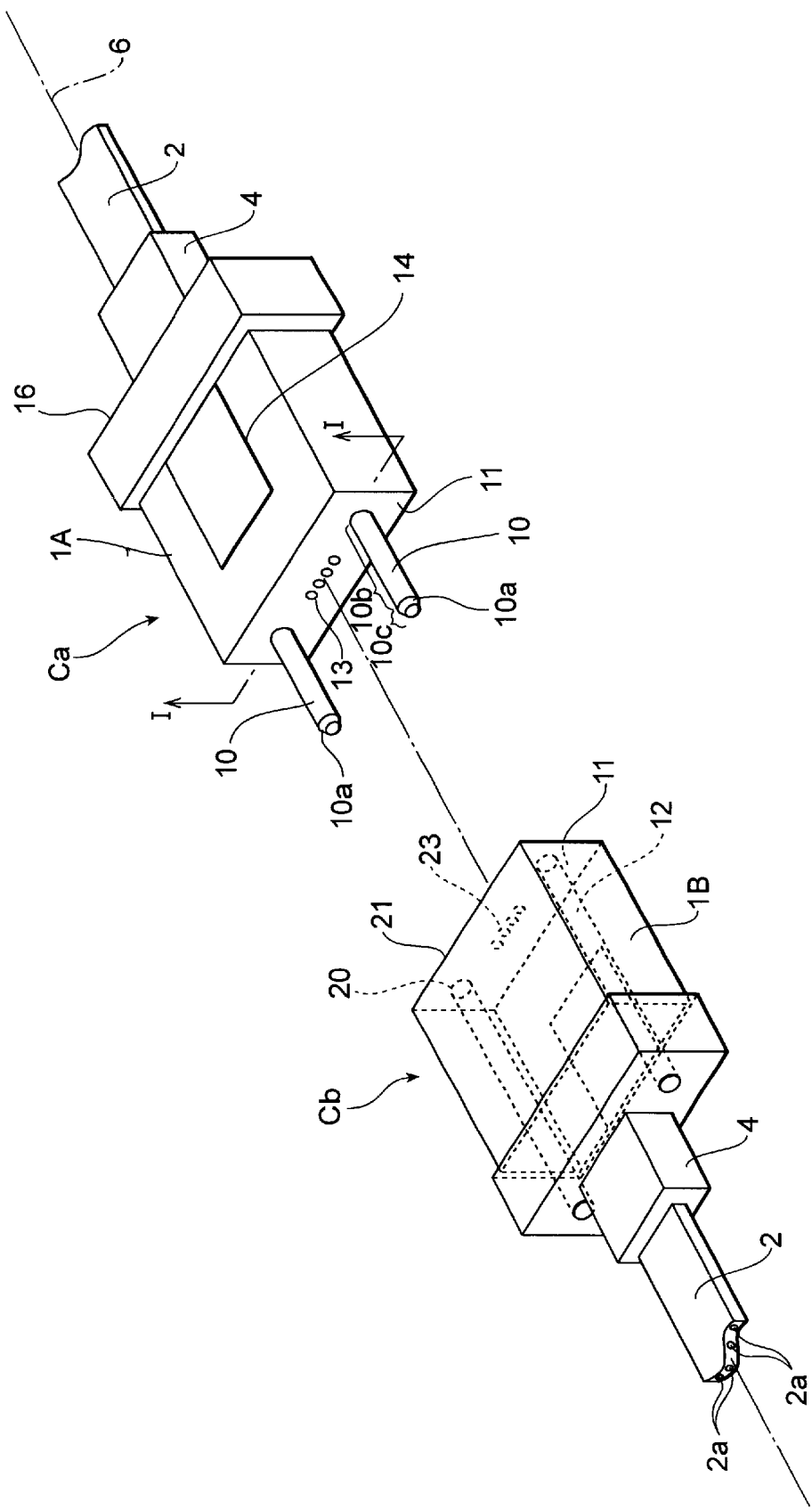
FIG. 1 is a perspective view showing an optical connector ferrule according to an embodiment of the present invention.

To facilitate the understanding of the present invention, identical and similar elements in the drawings will be denoted by the same reference numerals, if possible, to eliminate repetitive description.

An embodiment of an optical connector ferrule according to the present invention will be described with reference to FIGS. 1 and 2. FIG. 2 is a sectional view taken along a line I—I in FIG. 1.

An optical connector Ca has a ferrule 1A and a fiber optic ribbon cable 2 extending from one end face 16 of the ferrule 1A. The ferrule 1A has a mating surface 11 (connecting surface) opposed to this one end face 16. The mating surface 11 faces a mating surface 21 of an optical connector Cb to which the ferrule 1A is mated. On the mating surface 11, a pair of guide projections 10 are provided to be inserted into guide holes 20 of the optical connector Cb.

The optical connector Cb has a ferrule 1B and a fiber optic ribbon cable 2 extending from one end of the ferrule 1B. The ferrule 1B has a mating surface 21 opposed to this one end thereof. The mating surface 21 faces the mating surface 11 of the optical connector Ca to which the ferrule 1B is connected. In the mating surface 21, a pair of guide holes 20 into which a pair of guide projections 10 are inserted are disposed. The pair of guide holes 20 extend through the ferrule 1B to the surface opposed to the mating surface 21. The ferrule 1B used for the optical connector Cb is a component of the optical connector Cb which is integrally formed with a resin. Each guide hole 20 has an inner surface formed with the resin.

In the optical connector Ca, the pair of guide projections 10 extend continuously from the mating surface 11 of the ferrule 1A along a predetermined axis 6. The ferrule 1A is made of the same material as the pair of guide projections 10. For example, each guide projection 10 may be a pin having a columnar shape. The guide projection 10 has first and second portions 10b and 10c sequentially disposed from the mating surface 11 along the predetermined axis 6. The first portion 10b has a predetermined cross-sectional area. The second portion 10c have a cross-sectional area, taken on a plane intersecting the predetermined axis 6, which gradually decreases toward the distal end. Each guide projection 10 have a tapered surface 10a disposed on the second portion 10c. The tapered surface 10a tilts in the direction in which each guide projection 10 extends.

The second portions 10c allow the pair of guide projections 10 to be easily inserted into the corresponding pair of guide holes 20. The first portions 10b allow the accurate positioning of the optical fibers between the two connectors Ca and Cb when the guide projections 10 are inserted into the guide holes 20.

The length of the guide projection 10 preferably falls within the range from two to five times the diameter of the guide projection 10. According to the present inventor, the following is the reason why this range is preferable. To realize stable optical coupling, if each guide projection has a diameter of 0.7 mm, at least two times the diameter, i.e., 1.4 mm is needed. If the length of the guide projection 10 is less than two times the diameter, the connector may be disconnected easily, and the guide projection 10 cannot serve as a sufficient guide. If the length of the guide projection 10 exceeds five times the diameter, it is difficult to form the projection by molding. In addition, even if the insertion angle of the guide projection 10 slightly changes during insertion into the guide hole 20, the resultant force is readily applied in the guide projection. Therefore, a sufficient mechanical strength cannot always be obtained.

The optical fiber accommodating holes 13, which the optical fibers of the fiber optic ribbon cable 2 are housed, have their openings on the mating surface 11 of the ferrule 1A.

An introduction hole 15 extends along the predetermined axis 6 from the surface 16 opposed to the mating surface 11 so as to introduce the fiber optic ribbon cable 2. Optical fibers 2a exposed around the distal end of the fiber optic ribbon cable 2 are inserted into the introduction hole 15 of the ferrule 1A.

The ferrule 1A has the optical fiber accommodating holes 13 for supporting one or more optical fibers. According to the optical connector Ca shown in FIG. 1, the fiber optic ribbon cable 2 has four optical fibers 2a. To support these optical fibers, the ferrule 1A has four optical fiber accommodating holes 13 arranged parallel to each other. The optical fiber accommodating holes 13 extend along the predetermined axis 6 from the mating surface 11 through the ferrule 1A to the introduction hole 15.

The distal end portion of the fiber optic ribbon cable 2 is exposed to form the respective optical fibers reaching the mating surface 11. The fiber optic ribbon cable 2 is inserted from one end face 16 of the ferrule 1A into the introduction hole 15, and the exposed optical fibers are inserted into the optical fiber accommodating holes 13. Each optical fiber is housed in a corresponding one of the optical fiber accommodating holes 13. A boot 4 is engaged in the introduction hole 15.

An opening portion 14 is disposed in the upper surface of the ferrule 1A. The opening portion 14 extends in a direction perpendicular to the predetermined axis 6 and reach the optical fiber accommodating holes 13 and fiber insertion hole 15. The opening portion 14 is filled with adhesive after the optical fibers 2a are disposed in the optical fiber accommodating holes 13. By charging the adhesive through the opening portion 14, the optical fibers in the optical fiber accommodating holes 13, fiber optic ribbon cable 2, and boot 4 are secured in the ferrule 1A, thus forming the optical connector Ca.

Since the pair of guide projections 10 are disposed on the mating surface 11 of the ferrule 1A, it is difficult to polish the mating surface 11 to polish the end faces of the optical fibers in the optical fiber accommodating holes. Prior to the assembly of the fiber optic ribbon cable to the ferrule 1A, the end faces of the respective optical fibers are preferably polished by electrical discharge after the distal end of the fiber optic ribbon cable 2 is exposed.

To properly connect the optical connector Ca to the optical connector Cb, the mating surfaces 11 is coated with grease for matching refractive index to reduce reflected return light and connection loss at the connection. The connection loss can also be reduced by making PC (Physical Contact)connection between the ends of the optical fibers.

The ferrule 1A can be molded by molding methods such as injection molding with molding resins such as PPS (polyphenylene sulfide) resin. Manufacturing with a molding resin allows the formation of the ferrules 1A and 1B each of which have a complicated shape formed by the guide projections 10 and guide holes 20, thereby forming integral components. Preferably, this resin contains 39 to 65 wt % of silica particle filler and 26 to 35 wt % of silicate whisker filler, and the total content of the silica particle filler and silicate whisker filler is 65 to 85 wt %.

The use of a PPS resin allows the good dimensional stability, good creep characteristics, and good moldability of ferrules. The use of silica particle filler improves the dimensional stability of the ferrule 1A. The use of a silicate whisker filler increases the mechanical strength of the ferrule.

Containing silica particles in the resin lowers linear expansion and anisotropy coefficients of the resin to increase the dimensional accuracy of the ferrule 1A. The content of the silica particle filler is preferably 39 wt % or more and 65 wt % or less. If this content is less than 39 wt %, the linear expansion coefficient and anisotropy of the molded ferrule 1A increase, resulting in the deteriorated dimensional accuracy. If the content exceeds 65 wt %, the flowability of the PPS resin decreases. This may cause molding failure, whereby the dimensional accuracy may be deteriorated.

Containing silicate whisker filler in the resin can increase the dimensional accuracy and the mechanical strength of the ferrule 1A. This is because the silicate whisker filler has a low thermal expansion coefficient, resulting in good dimensional stability of the ferrule. In addition, since the surface of the resin containing the silicate whisker filler is inactive, the viscosity of the resin does not increase even with the increase in filling amount. Hence, a reinforced ferrule can be obtained. The content of the silicate whisker filler is preferably 26 wt % or more and 35 wt % or less. If this content is less than 26 wt %, the mechanical strength of the molded ferrule 1A becomes insufficient. If the content is more than 35 wt %, the anisotropy of the ferrule 1A increases in the molding process. This may results in the deterioration of dimensional accuracy.

The total content of the silica particle filler and silicate whisker filler is preferably 65 wt % or more and 85 wt % or less. If this content is less than 65 wt %, the filler cannot work effectively, resulting in the deteriorated dimensional accuracy of the molded ferrule 1A. If the content is more than 85 wt %, the content of the fillers becomes excessive. As a consequence, the flowability of the PPS resin may be deteriorated in the molding process, resulting in molding failure and the deterioration of the dimensional accuracy.

If the resin above is used for the ferrule 1A, an injection molding method can be used. In addition, the resin can reduce dimensional changes with time and maintain the dimensional accuracy and mechanical strength of the molded products. The injection molding method can shorten the molding cycle of time as compared with the transfer molding method using epoxy resin as in the prior art. This improves the productivity of the ferrule 1A. Since this resin is a thermoplastic resin, it ensures the good releasability from a mold. This can prevent damage to the guide projections 10 in the releasing step.

As shown in FIG. 2, the ferrule 1A, including the pair of guide projections 10, is formed integrally. The optical connector Ca having the ferrule 1A is connected to the optical connector Cb having the ferrule 1B. In the connection, when the guide projections 10 and guide holes 20 of the optical connectors Ca and Cb are fitted to each other, the optical fiber accommodating holes 13 are positioned to optical fiber accommodating holes 23.

Since both the ferrules 1A and 1B are made of the synthetic resin, the guide projections 10 and guide holes 20 deform according to the same thermal expansion coefficient during and after the insertion. This allows the guide holes 20 to firmly hold the guide projections 10 without the effect of the deformation due to temperature changes. Hence, the stable connection therebetween can be obtained.

In addition, since both the ferrules 1A and 1B are made of the synthetic resin, the two ferrules undergo almost the same dimensional variations with time. This can maintain the stable connection therebetween without their variations with time.

Since the ferrules 1A and 1B have substantially the same hardness, this prevents the guide projections 10 from applying large force around the guide holes 20 during and after the insertion. This allows the guide holes 20 to firmly hold the guide projections 10. Hence the stable connection therebetween can be obtained.

If the guide projections 10 has substantially the same hardness as that of the guide holes, the wear-out of the guide projections 10 and guide holes 20 can be suppressed even with the repetitive connection of the connectors Ca and Cb. The stable transmission performance can be maintained even with their repetitive use.

Figure 18:
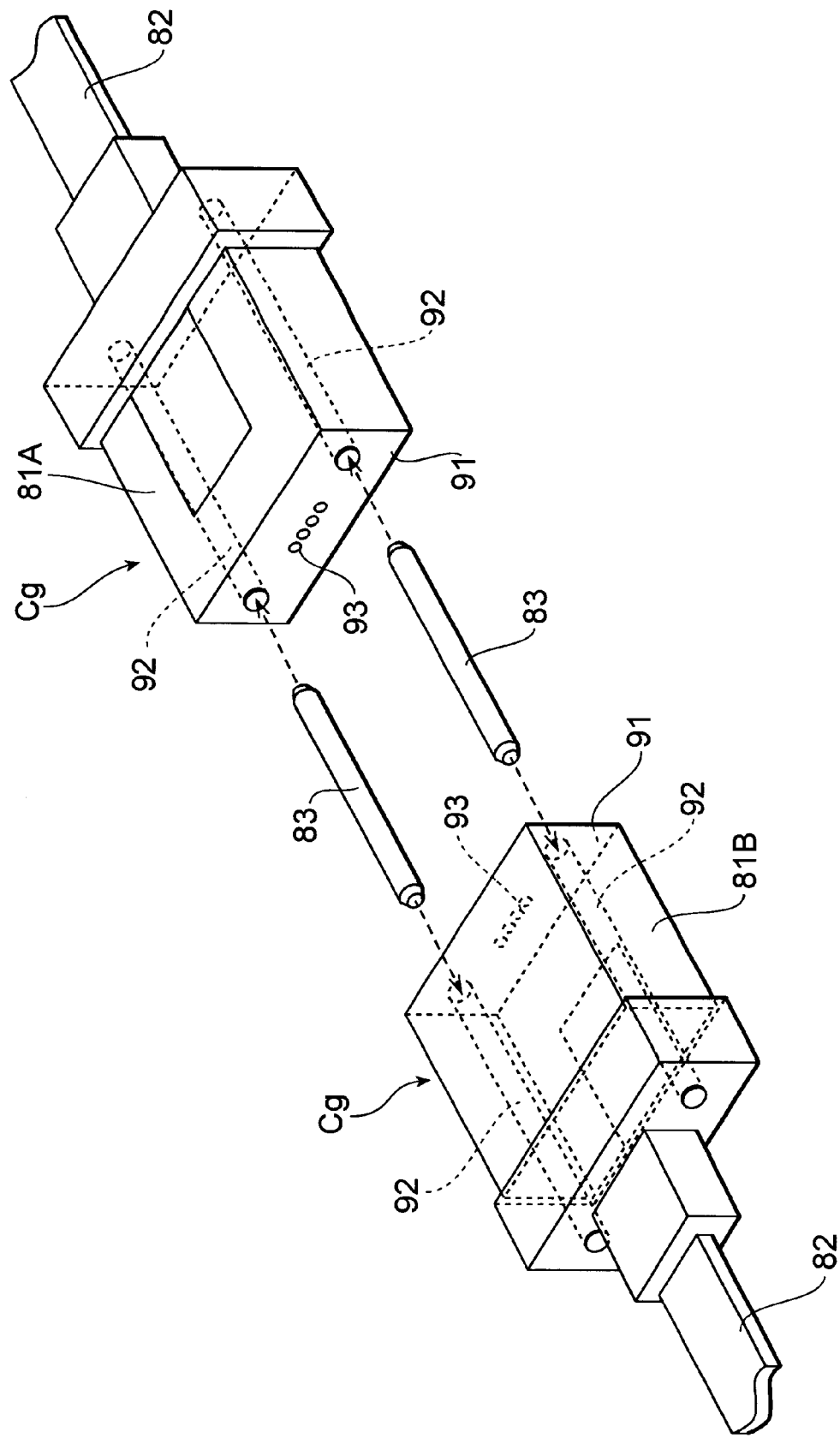
FIG. 18 is a view showing a pair of optical connector ferrules.

Since the guide projections 10 are integrally formed with the ferrule 1A, there are no additional parts such as guide pins (83 in FIG. 18). This facilitates the connection of the optical connectors Ca and Cb. In addition, there is no need to insert guide pins in connecting them with each other. This also facilitates connection of the optical connectors. Furthermore, any additional part need not be used in the connection. The smaller number of connection parts facilitates their maintenance. Since optical connectors are integrally molded with resin, no use of metal parts decreases the manufacturing cost.

If each guide projection 10 has a cylindrical shape, this shape facilitates the insertion of the projection into the guide hole 20. In the ferrules 1A and 1B, this can reduce the wear of the guide projections 10 and the inner surfaces of the guide holes 20. As a consequence, the stable transmission characteristics can be obtained.

If each guide projection 10 has a columnar shape, this shape easily ensures the high dimensional accuracy of the guide projection 10. For this reason, when the optical connector Ca is connected to the optical connector Cb, the end faces of the optical fibers can be faced to each other more accurately. This can reduce the connection loss.

In addition, since tapered surfaces 10a are formed on the distal end portions of the guide projections 10, the guide projections 10 can be inserted into the guide holes 20 of the optical connector Cb more easily. The tapered surface can also reduce the wear of the guide holes 20 and guide projections 10 around their opening ends effectively. As a consequence, the stable connection characteristics can be maintained more reliably.

Figure 3A:
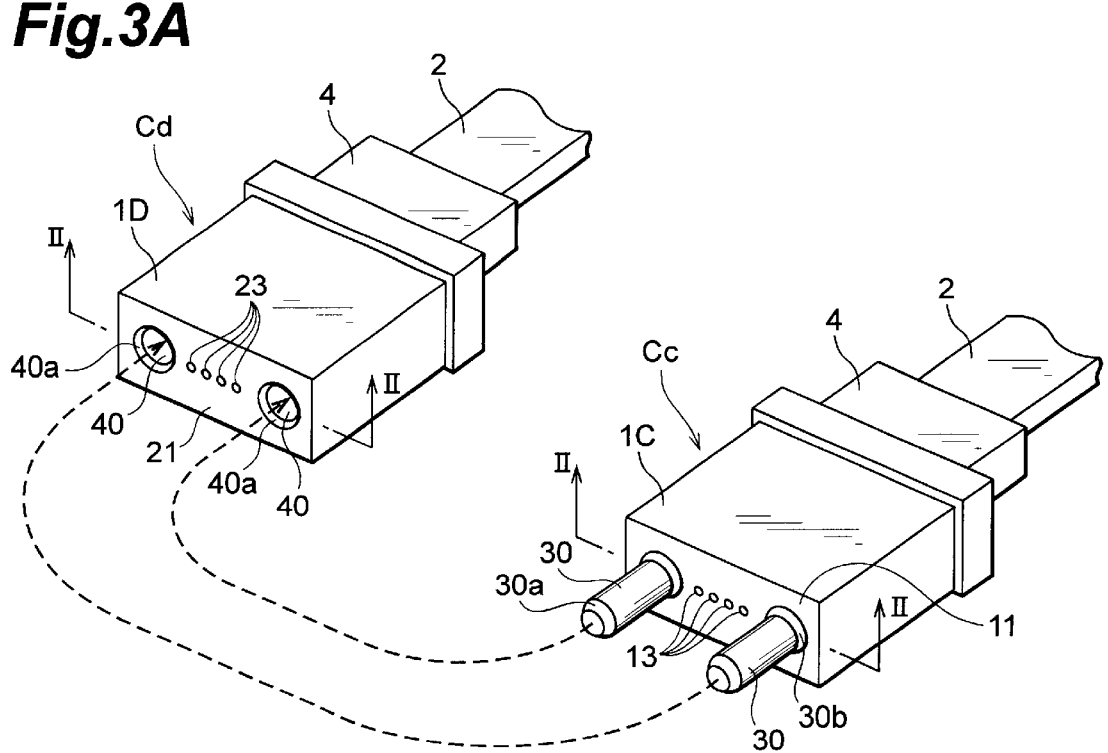
FIG. 3A is a perspective view showing a pair of optical connector ferrules according to another embodiment.
Figure 3B:
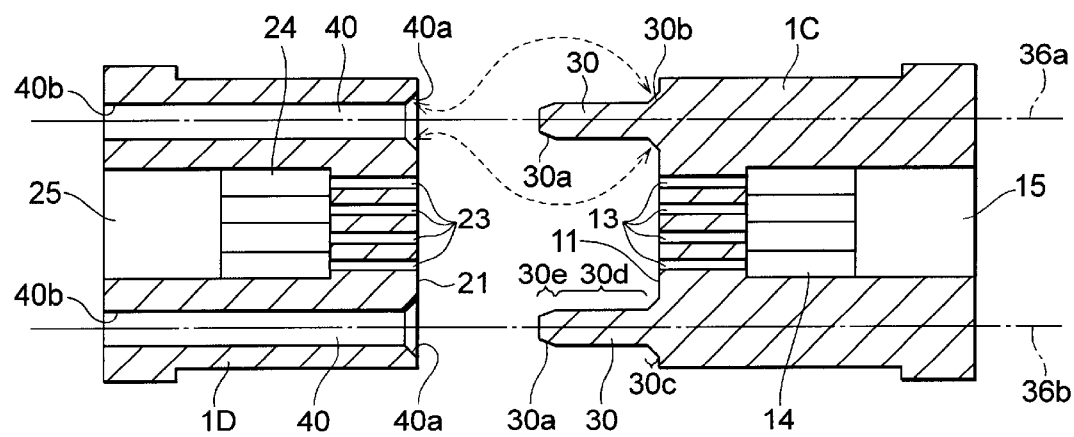
FIG. 3B is a view taken along a cross-section II—II of the optical connector ferrules in FIG. 3A.

FIG. 3A is a view showing another embodiment of the optical connector. FIG. 3B is a sectional view taken along a line II—II of a ferrule in FIG. 3A.

An optical connector Cc has a ferrule 1C, a fiber optic ribbon cable 2 extending from one end of the ferrule IC, and a boot 4 mounted on the fiber optic ribbon cable 2. On a mating surface 11, a pair of guiding projections 30 are disposed to be inserted into guide holes 40 of an optical connector Cd.

An optical connector Cd has a ferrule 1D, a fiber optic ribbon cable 2 extending from one end of the ferrule ID, and a boot 4 mounted on the fiber optic ribbon cable 2. The ferrule 1D has a pair of guide holes 40 on a mating surface 21 thereof into which the pair of guide projections 30 are inserted. The pair of guide holes 40 extend along predetermined axes 36a and 36b, respectively, through the ferrule 1D to the surface opposed to the mating surface 21. The ferrule 1D, which is integrally formed with a resin, is a component of the optical connector Cd. Each guide hole 40 has an inner surface 40b formed with the resin. The inner surface 40b of each guide hole 40 is provided to face the side surface of a corresponding one of the guide projections 30. Since the guide projection 30 inserted into the guide hole 40 moves along the inner surface 40b, the guide hole 40 defines the direction in which the guide projection 30 should be inserted. The guide hole 40 has a tapered surface 40a on its opening portion. With the tapered surface 40a, the guide hole 40 has a cross-sectional area gradually increasing toward the mating surface 21 along the direction in which the guide hole extends.

The pair of guide projections 30 of the optical connector Cc extend continuously from the mating surface 11 along the predetermined axes 36a and 36b, respectively. For example, each guide projection 30 may be a pin having a columnar shape. The respective guide projections 30 have first portions 30c, second portions 30d, and third portions 30e which are sequentially arranged on the mating surface 11 along the predetermined axes 36a and 36b. Each second portion 30d has a predetermined cross-sectional area. The third portions 30e have cross-sectional areas, gradually decreasing toward the distal ends, taken on planes intersecting the predetermined axes 36a and 36b, respectively. The first portions 30c have cross-sectional areas, gradually increasing toward their proximal ends, on planes intersecting the predetermined axes 36a and 36b, respectively. Each guide projection 30, therefore, has a tapered surface 30a, on its distal end portion 30e, tilting with respect to the direction in which the guide projection 30 extends. Each guide projection 30 can have a tapered portion 30b, on its proximal end portion 30c, tilting with respect to the direction in which the guide projection 30 extends. The tapered surface 30b has a radius of curvature of preferably less than 0.5 mm. In consideration of the application of the tapered surface 30b to an MT connector, the radius of curvature is preferably 0.55 mm or less.

The third portions 30e allow the pair of guide projections 30 to be easily inserted into the corresponding pair of guide holes 40. The second portions 30d allow the two connectors Cc and Cd to be positioned to each other when the guide projections 30 are inserted into the guide holes 40. The first portions 30c can reinforce the proximal end portions of the projections on which forces exerted on the pair of guide projections 30 are likely to concentrate.

As shown in FIG. 3B, the tilt of the tapered surface 30b is associated with that of the tapered surface 40a of the guide hole 40. The tapered portion 30c of the guide projection 30 is, therefore, accommodated in the corresponding guide hole 40.

One or more optical fiber accommodating holes 13 are disposed between the pair of guide projections 30. In the case of FIG. 3A, the pair of guide projections 30 and optical fiber accommodating holes 13 are arranged in a line.

The description of the connectors Ca and Cb are also applied to the connectors Cc and Cd. Likewise, the description of the connectors Cc and Cd are applied to the connectors Ca and Cb.

Figure 4A:
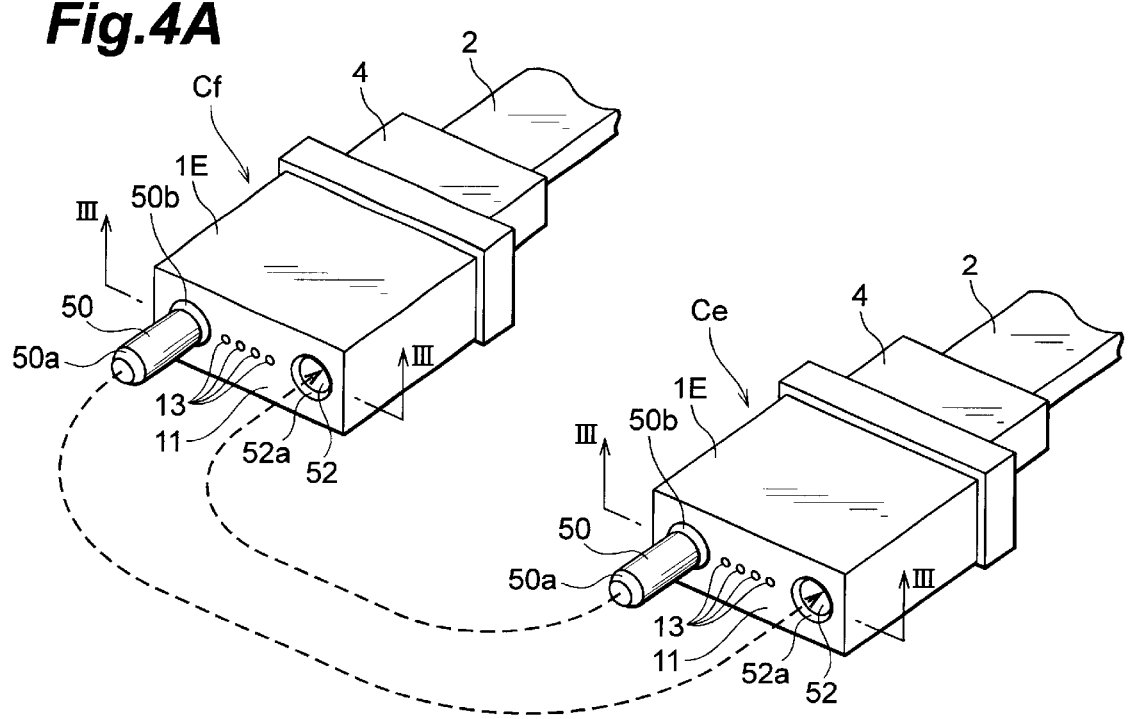
FIG. 4A is a perspective view showing a pair of optical connector ferrules according to still another embodiment.
Figure 4B:
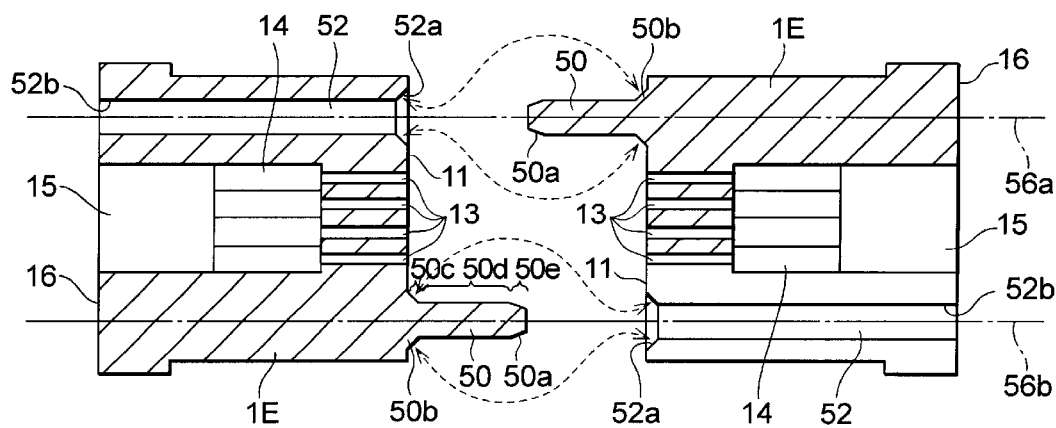
FIG. 4B is a view taken along a cross-section III—III of the optical connector ferrules in FIG. 4A.

FIG. 4A shows still another embodiment of the optical connector. FIG. 4B is a sectional view taken along a line III—III of the ferrule in FIG. 4A.

Each of optical connectors Ce and Cf has a ferrule 1E, a fiber optic ribbon cable 2 extending from the one end of the ferrule 1E, and a boot 4 mounted on the fiber optic ribbon cable 2. In this embodiment, the connectors Ce and Cf comprise the same ferrules 1E. The ferrule 1E of one optical connector Ce has, on a mating surface 11 thereof, a guide projection 50 to be inserted into a guide hole 52 of the ferrule 1E included in the other optical connector Cf. The ferrule 1E of one optical connector Ce has, on the mating surface 11 thereof, a guide hole 52 to be inserted into the guide projection 50 of the other optical connector Cf.

The guide holes 52 of the optical connectors Ce and Cf extend through the respective ferrules from the mating surfaces 11 to the surfaces 16 along predetermined axes 56a and 56b, respectively. For example, the guide holes 52 have columnar accommodations. The ferrules 1E are components of the connectors Ce and Cf, each ferrule 1E of which is integrally formed with a resin. Each guide hole 52 has an inner surface 52b formed with resin. The inner surface 52b of the guide hole 52 is provided to face the side surface of the guide projection 50 when the guide projection 50 is inserted. When the guide projection 50 is inserted into the guide hole 52, the guide projection 50 moves along the inner surface 52b. The guide hole 52, therefore, defines the direction in which the guide projection 50 should be inserted. The guide hole 52 has a tapered surface 52a on its opening portion. With the tapered surface 52a, the cross-sectional area of the guide hole 52 gradually increases toward the mating surface 11 in the direction in which the guide hole 52 extends.

The guide projections 50 of the connectors Ce and Cf continuously extend from the mating surface 11 along the predetermined axes 56a and 56b, respectively. For example, each guide projection 50 can be a pin having a columnar shape. The guide projections 50 of the connectors Ce and Cf respectively have first portions 50c, second portions 50d, and third portions 50e which are sequentially disposed on the mating surfaces 11 along the predetermined axes 56a and 56b, respectively. The first and third portions 50c and 50e have respective tapered surfaces 50b and 50a as in the ferrules IC and ID shown in FIG. 3A. When the optical connectors Ce and Cf are connected to each other, the tapered surfaces 52a face the tapered surfaces 50b as indicated in the dashed lines of FIG. 4B. The tapered portions 50c of the guide projections 50 are housed in the guide holes 52.

One or more optical fiber accommodating holes 13 are disposed between the guide projection 50 and guide hole 52. In an example shown in FIG. 4A, the guide projection 50, guide hole 52, and optical fiber accommodating holes 13 are arranged in a line.

The description of the connectors Ce and Cf is also applied to the connectors Ca, Cb, Cc, and Cd. Likewise, the description of the connectors Ca, Cb, Cc, and Cd is applied to the connectors Ce and Cf.

Figure 2:
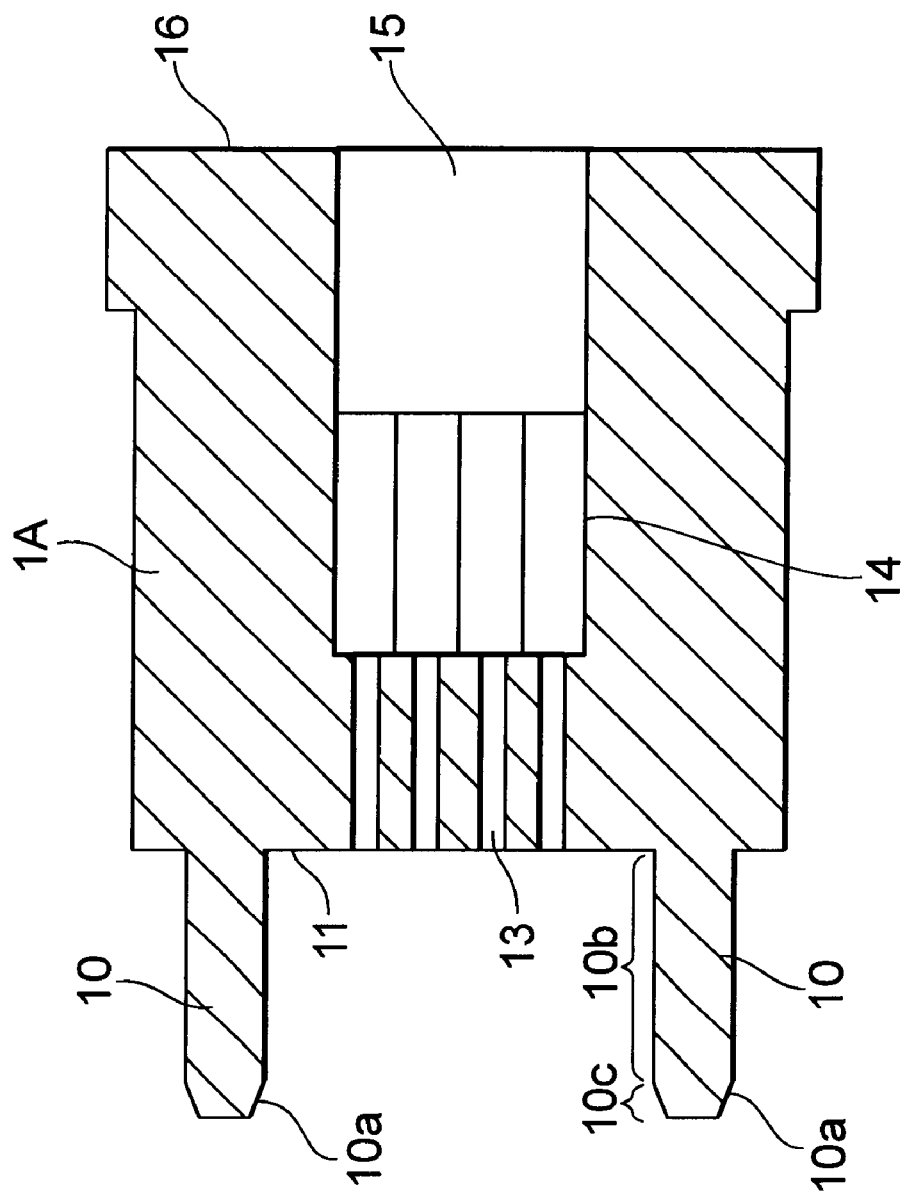
FIG. 2 is a view taken along a cross-section I—I of the optical connector ferrule in FIG. 1.
Figure 5:
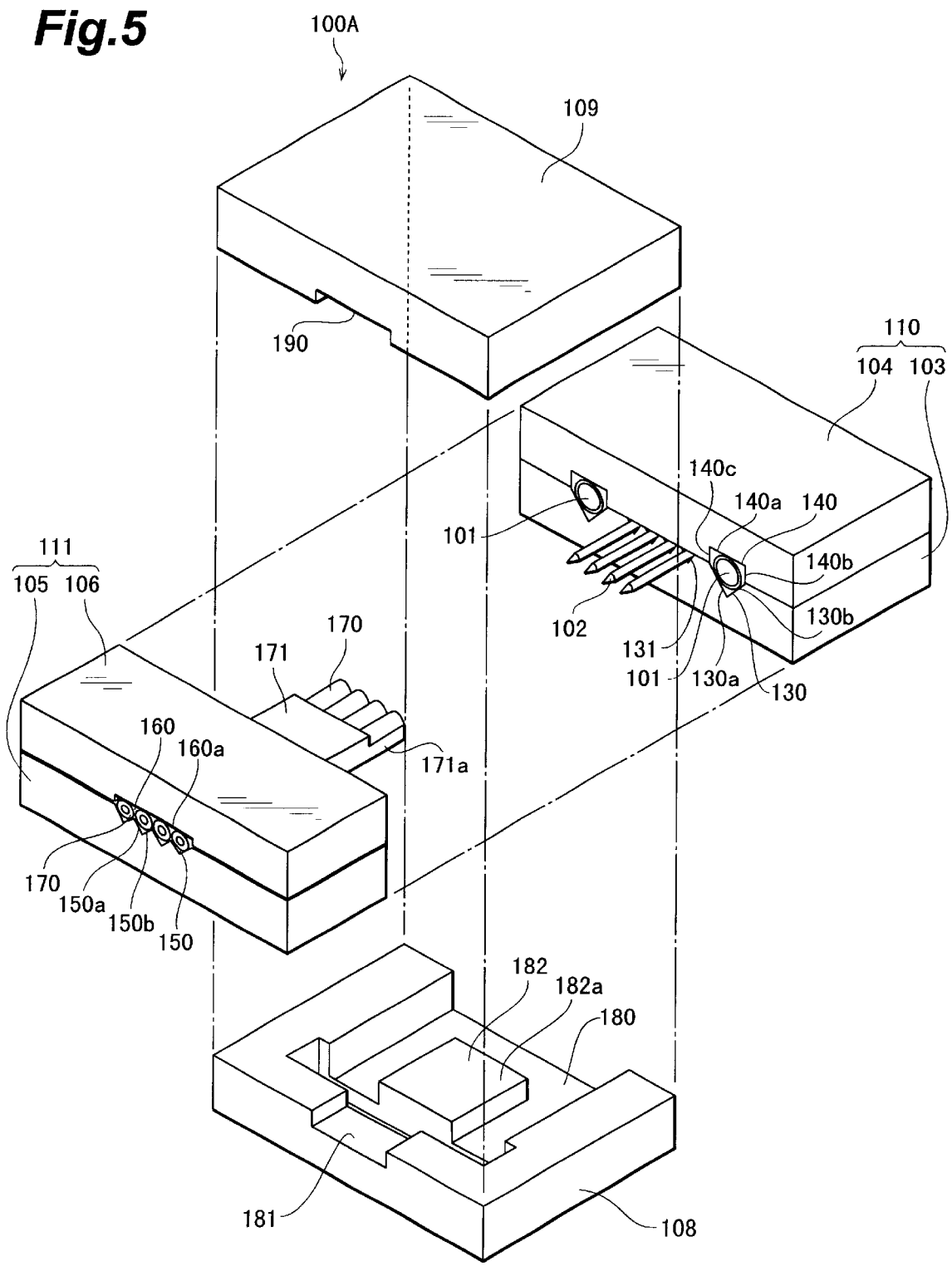
FIG. 5 is a perspective view showing a mold for molding the ferrule of FIG. 1.

The ferrule 1A as shown in FIGS. 1 and 2 can be molded with a mold shown in FIG. 5.

A mold 100A includes a first mold unit 108, second mold unit 109, third mold unit 110, and fourth mold unit 111. These mold units 108, 109, 110, and 111 define a cavity for molding the ferrule 1A.

The third mold unit 110 has a first holding member 103 and second holding member 104. The third mold unit 110 has pins 102 for forming accommodating holes. The first holding member 103 and second holding member 104 clamp accommodating hole forming pins 102 at one end portions thereof to secure the pins 102. The third mold unit 110 is provided so as to be slidably moved relative to the mold units 108 and 109 along a predetermined axis, and includes four accommodating hole forming pins 102.

The first holding member 103 has a groove such as a V-shaped groove 130 having two sides 130a and 130b. The second holding member 104 has a groove such as a rectangular groove 140 having a bottom 140a and two sides 140b and 140c. The first holding member 103 and second holding member 104 hold a pair of cylindrical portions 101 therebetween. In an example shown in FIG. 5, in order to accurately position cylindrical portions 101, each cylindrical portion 101 is supported by three surfaces, i.e., the bottom surface 140a of the rectangular groove 140 of the first holding member 103 and the two side surfaces 130a and 130b of the V-shaped groove 130 of the second holding member 104.

Each cylindrical portion 101 has an inner surface opposed to the side surface of the guide projection 10 and a bottom surface opposed to the bottom surface of the guide projection 10. The inner surface and bottom surface are coated with chromium nitride. Each cylindrical portion 101 extends along a predetermined axis and has a cross-sectional area, on a plane perpendicular to the axis, corresponding to that of the guide projection.

As shown in FIG. 5, the four accommodating hole forming pins 102, each having a diameter almost equal to that of each fiber accommodating hole 13 of the molded ferrule 1A, are arranged between the pair of cylindrical portions 101. Each accommodating hole forming pin 102 has one end portion and the other end portion. The first holding member 103 and second holding member 104 clamp one end portion of each accommodating hole forming pin 102 therebetween. In order to position the accommodating hole forming pins 102, each of these pins 102 is supported by three surfaces, i.e., two side surfaces of a V-shaped groove 131 of the first holding member 103 and one flat surface of the second holding member 104.

Figure 6:
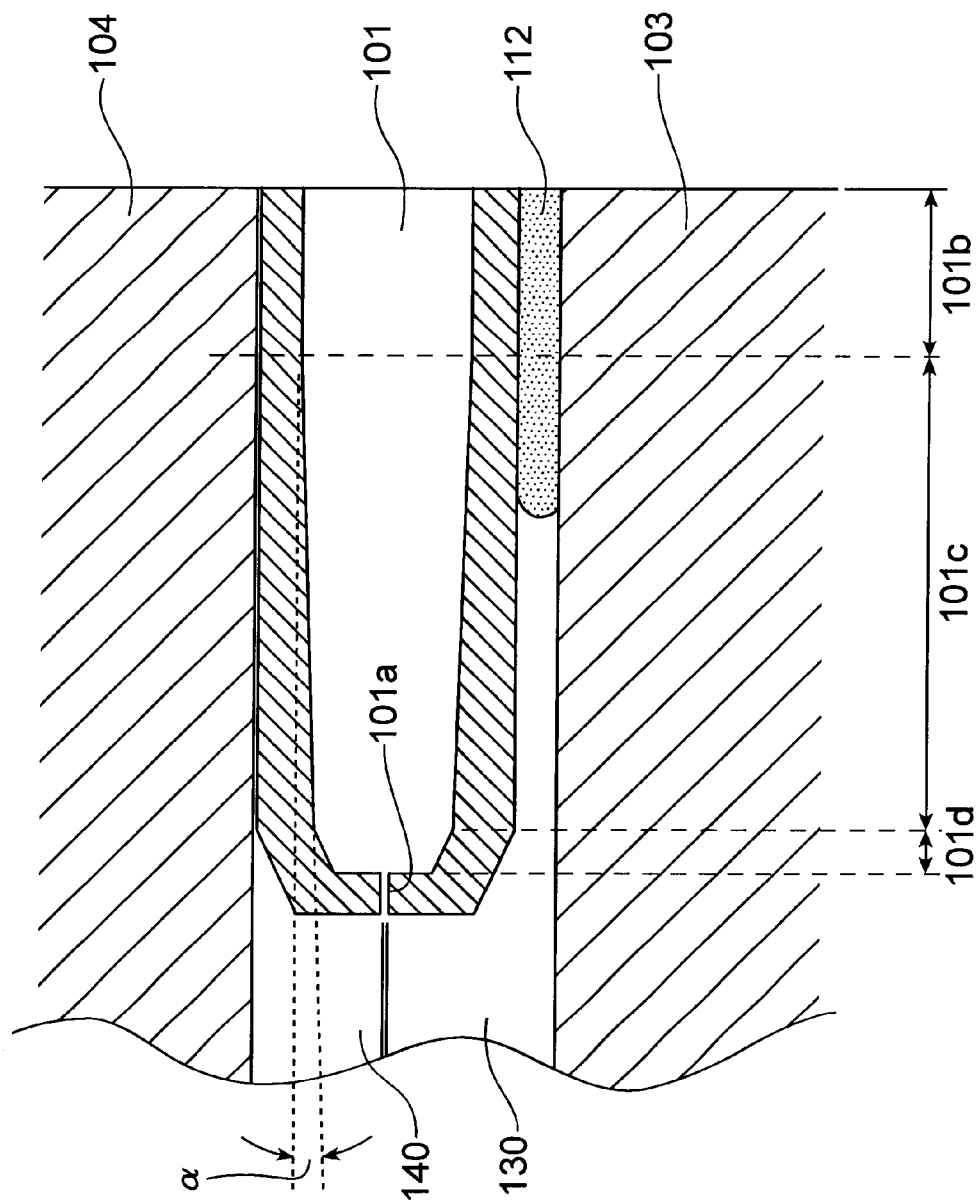
FIG. 6 is a partial sectional view of a portion of the mold in FIG. 5.

Referring to FIG. 6, each cylindrical portion 101 has a first portion 10b, second portion 101c, and third portion 101d, which are disposed sequentially from its opening along a predetermined axis. The first portion 101b has a predetermined cross-sectional shape. A numeral value, such as a diameter, that represents the cross-sectional shape of the second portion 101c continuously decreases toward the bottom portion. This implements a tapering angle α for removing the guide projection 10 of the ferrule 1A. This structure makes it easy to remove the guide projections 10 when the third mold unit is slid to extract the ferrule 1A from the mold. As a consequence, the ferrule 1A can be extracted from the mold without any damage. The tapering angle α is preferably about 1 to 2 degrees with respect to the direction in which the cylindrical portions 101 extend. The third portion 101d has a taper forming portion 101d for forming the tapered surface 10a on the distal end of the guide projection 10. The tapering angle α is set independently of the tapered surface 10a of the guide projection 10, and is smaller than the angle defined by the tapered surface 10a.

As shown in FIG. 6, a vent 101a as an air releasing hole is provided in the inner surface of the cylindrical portion 101. The vent 101d can extend to the surface of the third mold unit 110. The vent 101 allows a molten molding resin to be easily charged into the cylindrical portion 101 and also allows the positioning projection 10 to be easily extracted after molding.

The gap between the cylindrical portion 101 and accommodating hole forming pin 102 is filled with a sealing agent 112. This prevents the resin from flowing into the gap in the molding process.

Referring to FIG. 5, the fourth mold unit 111 has cylindrical members 170 provided to face the accommodating hole forming pins 102. The fourth mold unit 111 can be slidably moved relative to the first and second mold units 108 and 109 along a predetermined axis. When the third and fourth mold units 110 and 111 slide relative to the first and second mold units 108 and 109, the distal ends of the cylindrical members 170 receive the distal ends of the accommodating hole forming pins 102. With this configuration, the optical fiber accommodating holes 13 extending from the mating surface 11 to the introduction hole 15. Each of the four cylindrical members 170 has first, second, and third portions arranged along its length. Each cylindrical member 170 is clamped between a third holding member 105 and fourth holding member 106 at the first portion thereof. In this manner, the cylindrical members 170 are secured to the third holding member 105 and fourth holding member 106. The second portion of each cylindrical member 170 extends through a rectangular portion 171 of the fourth mold unit 111. At the third portion of each cylindrical member 170, the upper half of each rectangular portion 171 is exposed, and the lower half is covered with a support portion extending from the rectangular portion 171.

The diameter of each cylindrical members 170 is almost equal to that of each accommodating hole forming pin 102. The cylindrical members 170 hold the accommodating hole forming pins 102 inserted therein at the distal ends to position them. Each cylindrical member 170 has a recess, in the distal end portion thereof, for receiving the distal ends of the accommodating hole forming pins 102. In place of these recesses, each cylindrical member 170 has a through hole extending in the longitudinal direction. With the through hole, air inside the cylindrical members is released therethrough when the accommodating hole forming pins 102 meet the cylindrical members 170. This allows the easy insertion of the accommodating hole forming pins 102. Each cylindrical member 170 is accurately positioned by a bottom surface 160a and two sides 150a and 150b. The fourth holding member 106 includes a rectangular groove 160 with the bottom 160a. The third holding member 105 includes a V-shaped groove 150 with the sides 150a and 150b.

A cavity 180 for forming the ferrule 1A is formed in the inner space provided by the first and second mold units 108 and 109. A projection 182 for forming the opening portion 14 extends from the first mold unit 108 into the cavity 180. When the first to fourth mold units 108, 109, 110, and 111 are combined, a bottom surface 171a of the rectangular portion 171 comes into contact with an upper surface 182a of the projection 182. The first and second mold units 108 and 109 have respective rectangular notched portions 181 and 190 which are disposed in the surfaces opposed to the fourth mold unit 111, such that the rectangular portion 171 can pass through the notched portions 181 and 190. The notched portions 181 and 190 allow the fourth mold unit 111 to move along a predetermined axis.

The ferrule 1C shown in FIG. 3 is molded with a mold shown in FIGS. 7 and 8A to 8D.

Figure 7:
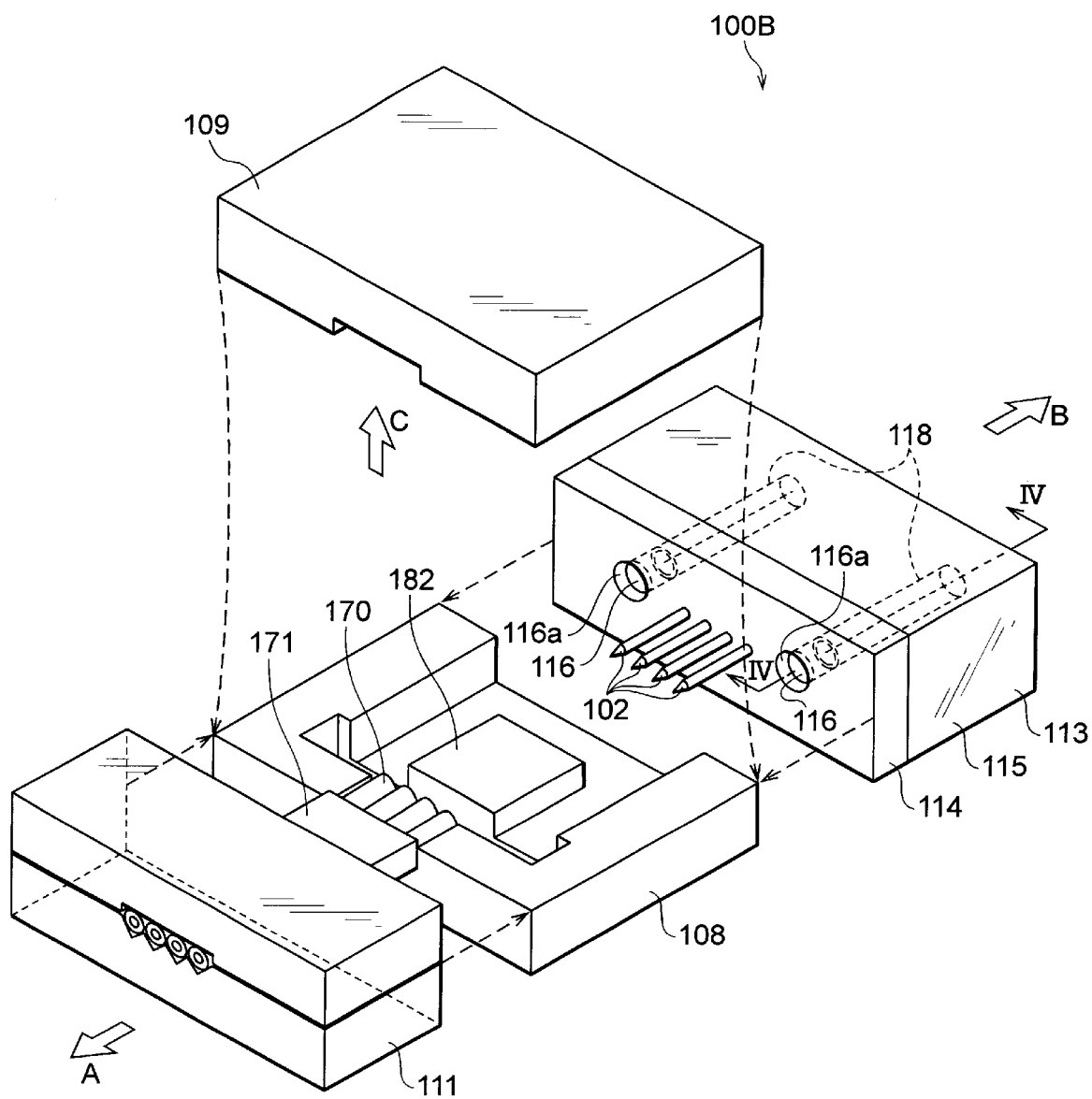
FIG. 7 is a perspective view showing a mold for molding the ferrule of FIG. 3A.

A mold 100B has a first mold unit 108, second mold unit 109, third mold unit 113, and fourth mold unit 111. These mold units 108, 109, 113, and 111 define a cavity for molding the ferrule 1C. Referring to FIG. 7, the second mold unit 109 can be moved in the direction C; the third mold unit 113 can be moved in the direction B; and the fourth mold unit 111 can be moved in the direction A.

The third mold unit 113 has a fifth holding member 114 and sixth holding member 115. The third mold unit 113 has accommodating hole forming pins 102 extending along a predetermined axis. The fifth holding member 114 is a member, such as a plate having a pair of rectangular flat surfaces. A wire electric discharge machining is applied to form the following holes of a plate member. It is, therefore, preferable that the member have a thickness suitable for the wire electric discharge machining. As shown in FIG. 8D, the fifth holding member 114 has four holes 117 extending through the member 114 from one of the pair of flat surfaces to the other. The accommodating hole forming pins 102 are inserted into the holes 117. As shown in FIGS. 8B and 8C, the fifth holding member 114 has a pair of through holes 116 extending in the same direction as the accommodating hole forming pins 102. Each through holes 116 has a tapered surface 116a gradually increasing its circular cross-section toward one rectangular flat surface 114a and an inner surface 116b having a circular cross-section. The tapered surface 116a corresponds to a tapered surface 30b disposed on the proximal end of the guide hole 30. The sixth holding member 115 has a pair of holes 115a extending in the same direction as the through holes 116. The pair of holes 115a of the sixth holding member 115 are positioned to the through holes 116 of the fifth holding member 114. The fifth holding member 114 and sixth holding member 115 are secured such that the pair of holes 116 are matched with the pair of holes 115a.

Figure 8A:
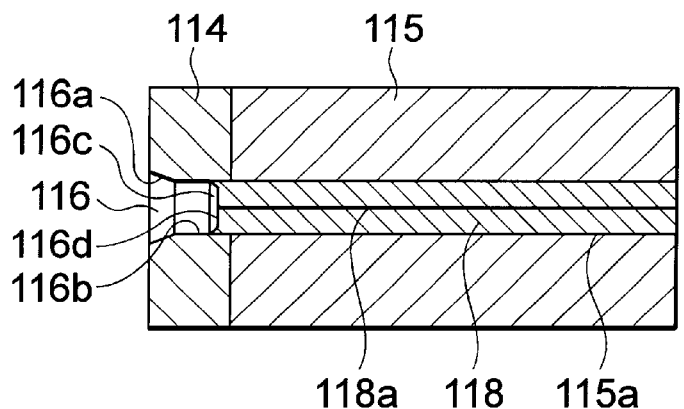
FIG. 8A is a view taken along a cross-section IV—IV of FIG. 7.
Figure 8B:
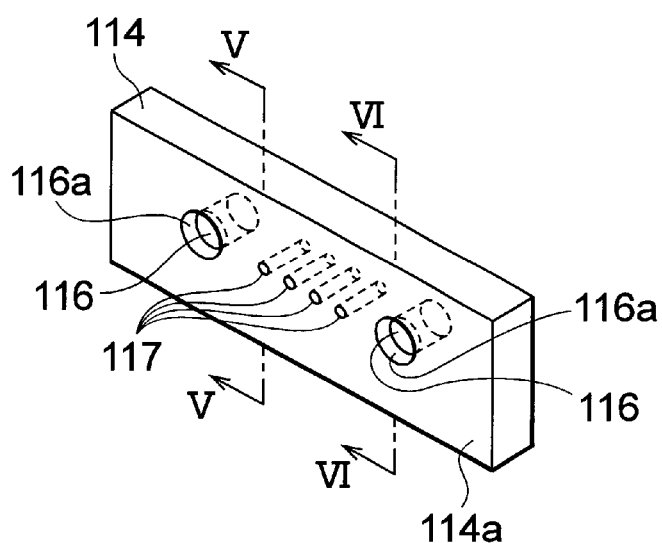
FIG. 8B is a view showing an auxiliary member.
Figure 8C:
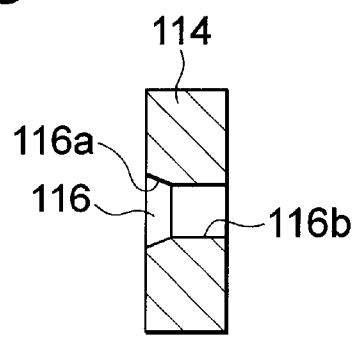
FIG. 8C is a view taken along a cross-section V—V of FIG. 8B.
Figure 8D:
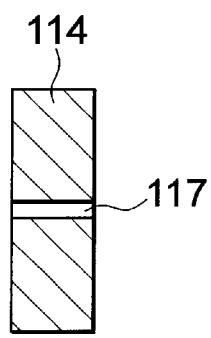
FIG. 8D is a view taken along a cross-section VI—VI of FIG. 8B.

Referring to FIG. 8A, rods 118, each having a diameter equal to that of the through holes 116 and 115a, are inserted into the corresponding through holes 116 and 115a from their respective openings on the sixth holding member 115. The length of each rod 118 is determined to define the length of the guide projection 30. One end of the rod 118A is disposed to provide a depressed portion 116c, which defines a taper 30a on the distal end of the guide projection 30. A ventilating hole 118a is provided in a bottom surface 116d of the depressed portion 116c to extend to the other end of each rod 118. The ventilating holes 118a allow the resin to easily flow into the holes 116 and also allow the guide projection 30 to be easily removed from the holes 116.

Figure 9:
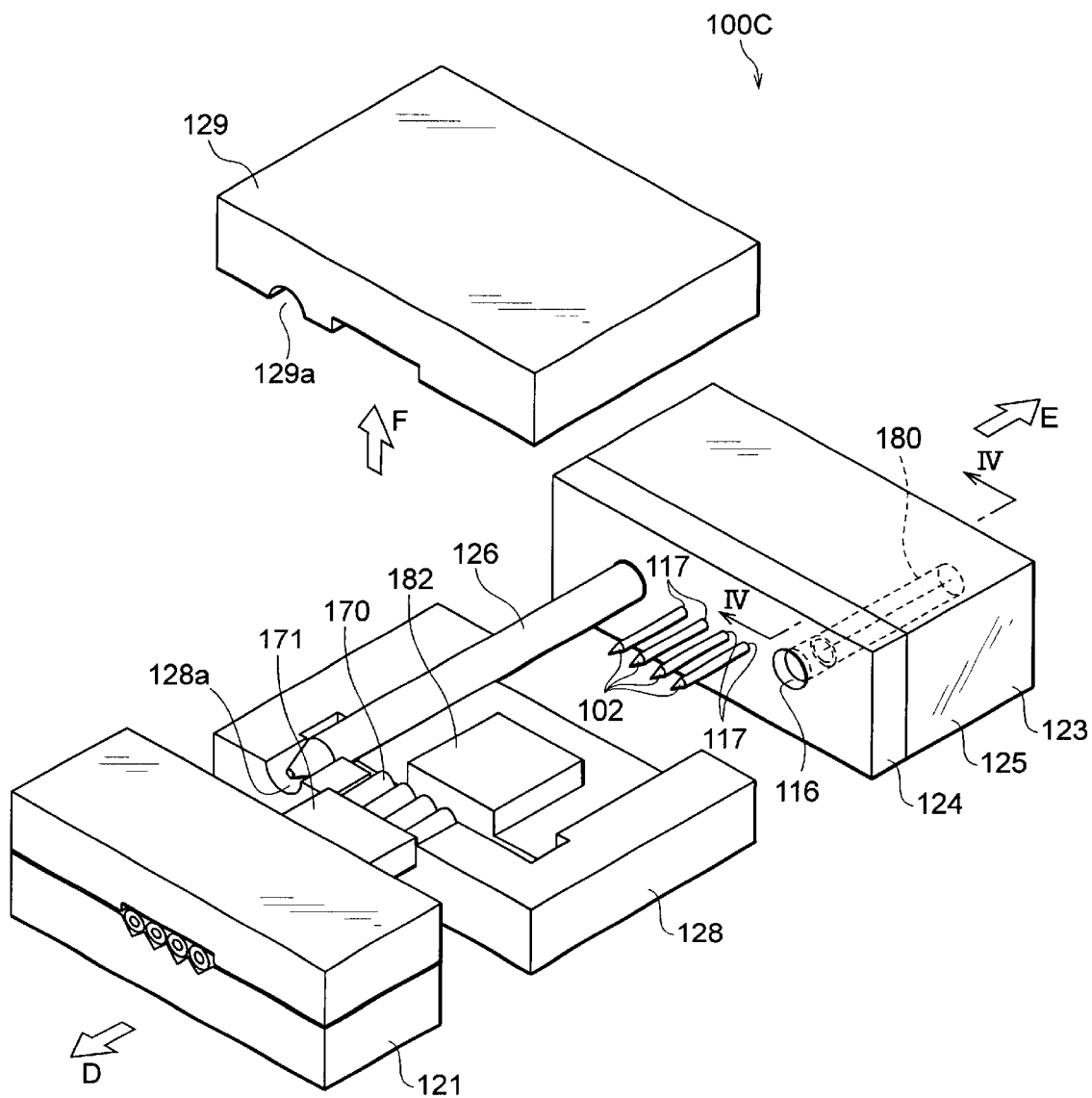
FIG. 9 is a perspective view showing a mold for molding the ferrule of FIG. 4A.

The ferrule 1E shown in FIG. 4 is molded using a mold shown in FIG. 9.

A mold 100C has a first mold unit 128, second mold unit 129, third mold unit 123, and fourth mold unit 121. These mold units 128, 129, 123, and 121 define a cavity for molding the ferrule 1E. The second mold unit 129 can be moved in the direction F; the third mold unit 123 can be moved in the direction E, and the fourth mold unit 121 can be moved in the direction D.

The third mold unit 123 has accommodating hole forming pins 102 extending along a predetermined axis.

The third mold unit 123 has a seventh holding member 124 and eighth holding member 125. The seventh holding member 124 is a member, such as a plate having a pair of rectangular flat surfaces. The seventh holding member 124 has four holes 117 extending through the member from one of the pair of flat surfaces to the other. The accommodating hole forming pins 102 are inserted into the holes 117. As shown in FIG. 8C, the seventh holding member 124 has a single through hole 116 extending in the same direction as the accommodating hole forming pins 102.

The third mold unit 123 has a guide hole forming portion 126 extending along a predetermined axis. The guide hole forming portion 126 is disposed on the surface on which the accommodating hole forming pins 102 are disposed. The guide hole forming portion 126 has a cross-sectional area, which corresponds to that of the through hole 116, taken on a plane perpendicular to a predetermined axis. For example, if the cross-section of the through hole 116 is circular, the guide hole forming portion 126 has a circular cross-section having a diameter substantially equal to that of the through hole 116.

In order to receive the guide hole forming portion 126, the first and second mold units 128 and 129 have respective notched portions 128a and 129a, each corresponding to the shape of the guide hole forming portion 126. Referring to the mold 100C shown in FIG. 9, each of the notched portions 128a and 129a has a semicircular associated with the columnar guide hole forming portion 126. In molding the ferrule 1E, the third mold unit 123 is moved by a distance sufficient to extract the guide hole forming portion 126 from the resin-molded ferrule 1E.

A method of manufacturing the ferrule 1A using the mold above will be described with reference to FIGS. 10 to 12.

Figure 10:
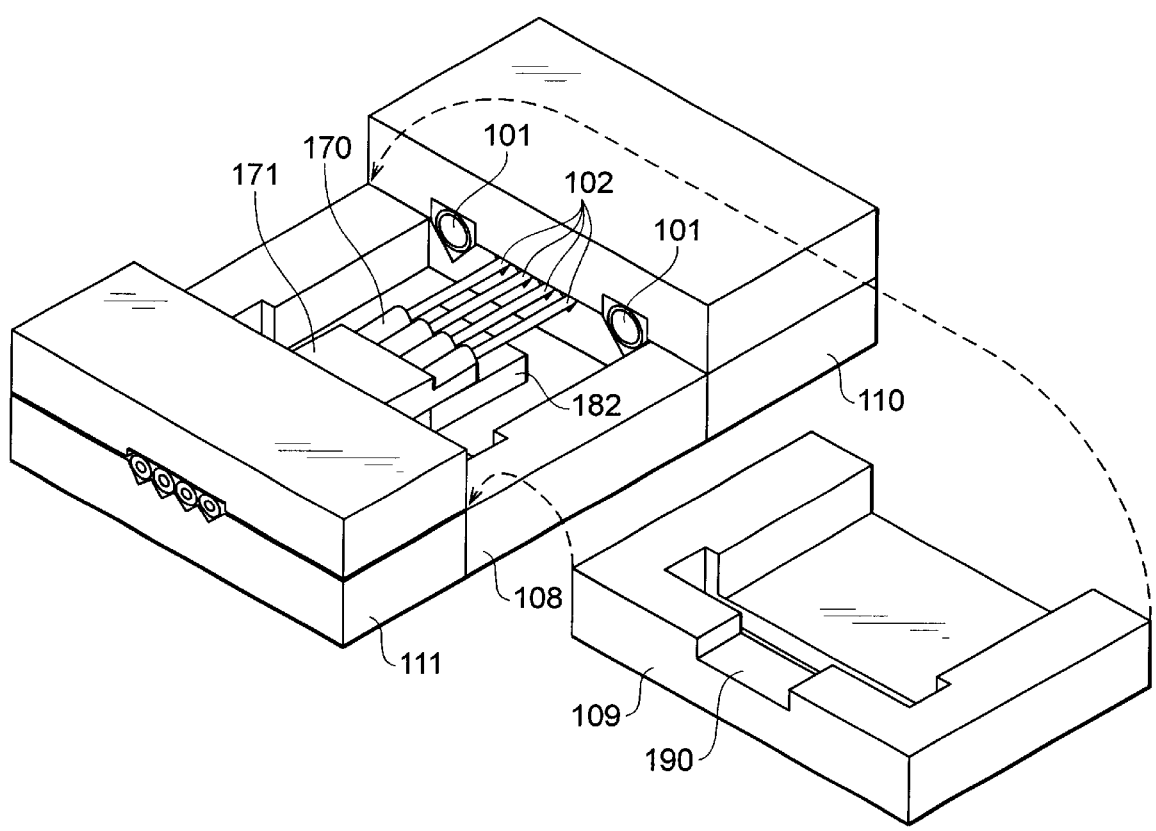
FIG. 10 is a view showing a step in manufacturing the ferrule of FIG. 1.

As shown in FIG. 10, when the ferrule 1A is molded with the mold as described above, the first to fourth mold units are arranged to form a cavity. For example, the second mold unit 109 are placed on the first mold unit 108.

The accommodating hole forming pins 102 and cylindrical members 170 are slid between the first and second mold units 108 and 109 so as to be combined on the mold unit 108. The rectangular portion 171 is introduced through the rectangular notched portions 181 and 190 between the mold units 108 and 109. The lower surface 171a of the rectangular portion 171 is then brought into contact with the upper surface 182a. The distal ends of the accommodating hole forming pins 102 are inserted into the cylindrical members 170 and positioned.

Alternatively, the accommodating hole forming pins 102 and cylindrical members 170 are slid onto the first mold unit 108, and the second mold unit 109 is then fitted on the first mold unit 108.

Figure 11:
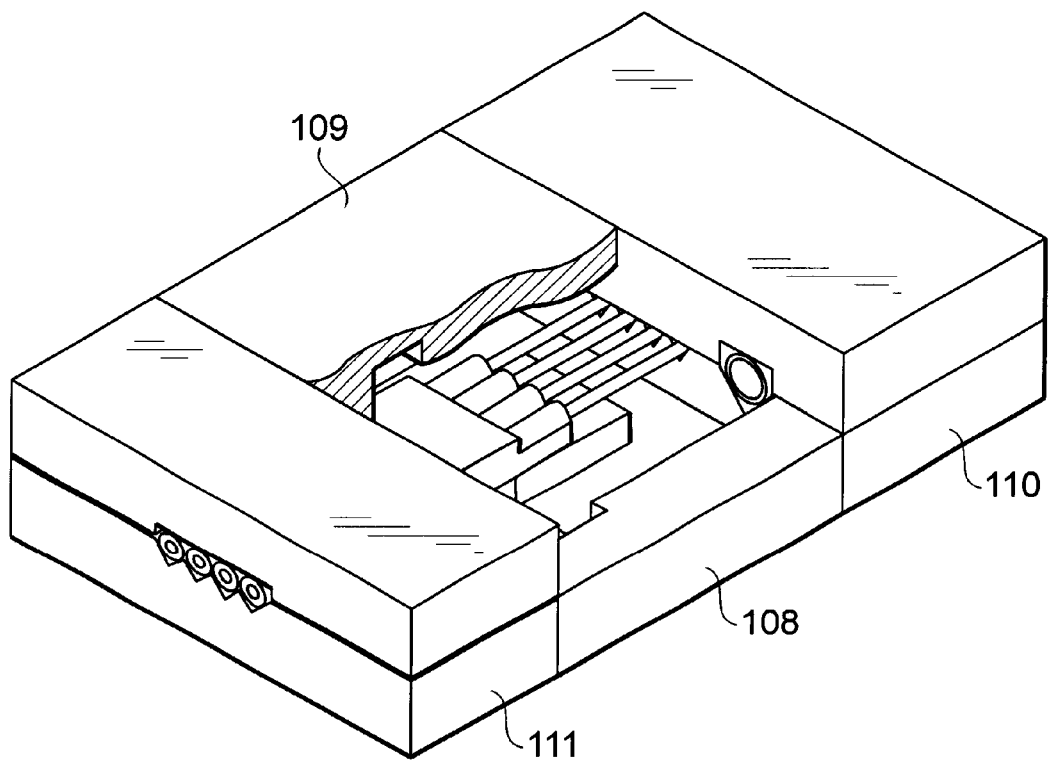
FIG. 11 is a view showing a step in manufacturing the ferrule of FIG. 1.

As shown in FIG. 11, after the cavity is formed, molten resin is charged into the mold units 108, 109, 110, and 111 through a gate (not shown). Thereafter, cooling the mold solidifies the resin. The guide projections 10 are formed by the cylindrical portions 101, and the fiber accommodating holes 13 are formed by the accommodating hole forming pins 102. The opening portion 14 and fiber introduction hole 15 are formed by the projection 182 and rectangular portion 171, respectively.

Figure 12:
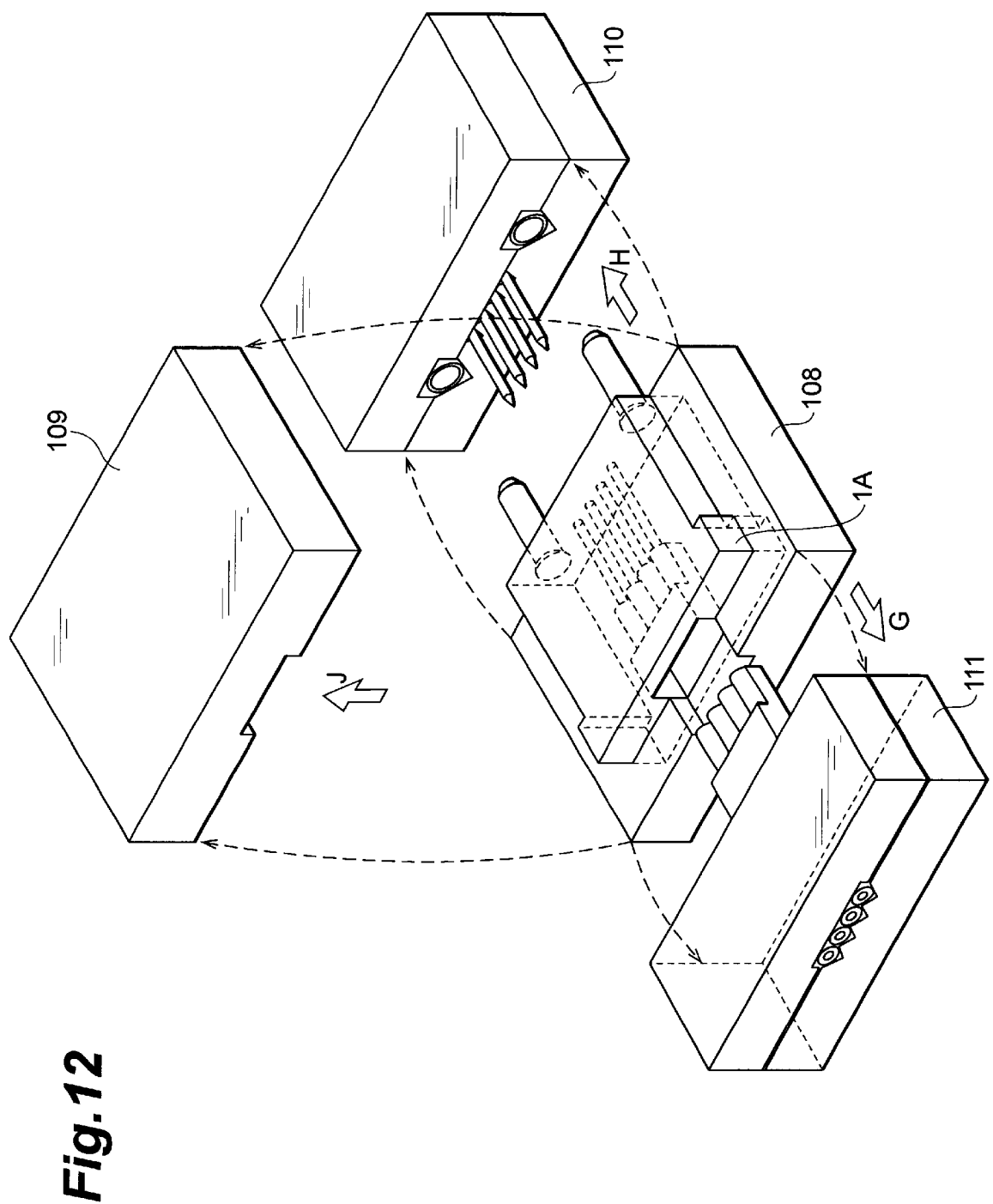
FIG. 12 is a view showing a step in manufacturing the ferrule of FIG. 1.

When the resin set in the mold units 108, 109, 110, and 111, the third and fourth mold units 110 and 111 are slid along predetermined axes (in directions G and H in FIG. 12). The accommodating hole forming pins 102 are pulled out of the mold units 108 and 109, and the guide projections 10 are pulled out of the fourth mold unit 110. As shown in FIG. 12, the first and second mold units 108 and 109 are then opened (in a direction J in FIG. 12) to extract the molded ferrule 1A.

Since the cylindrical portions 101 has the tapering angle α and the inner surfaces coated with chromium nitride, the molded guide projections 10 can be released from the cylindrical portions 101 without any damage when the third mold unit 110 is slid along a predetermined axis. The taper 10a on the distal end of each guide projection 10 reflects the shape of the cylindrical portion 101. The taper 10a makes it easier to release the guide projections 10.

A guide projection 10 with a smaller diameter and a larger length is likely to be damaged in the releasing process. The diameter and total length are, therefore, preferably determined in consideration of releasability. The total length is preferably equal to or larger than two times the diameter and equal to or smaller than five times the diameter. For example, the typical diameter is about 0.6990 mm.

According to the method of manufacturing the ferrule with the mold as described above, the ferrule 1A including the guide projections 10 is allowed to be molded integrally with a synthetic resin. In the same manner, the ferrules 1C and 1E can be manufactured by the molds 100B and 100C, respectively. Thus, the ferrules 1C and 1E also have the same advantages as those provided by the mold 100A. The optical connector ferrules with these advantages above can be easily and reliably manufactured.

A method of inspecting the dimensional accuracy of each of the ferrules 1A, 1B, and 1C molded using the molds above will be described below.

In the ferrules 1A and 1B, optical fibers are arranged in the fiber accommodating holes 13. The ferrule 1A is positioned to the ferrule 1B with the guide projections 10. The positioning allows the ends of the optical fibers in the ferrules 1A to face the ends of the corresponding optical fibers in the ferrules 1B with high accuracy. If the positions of the optical fiber accommodating holes 13 deviate from the correct positions with respect to the guide projections 10, the connection loss increases. For example, temperature changes after the molding process may cause unexpected shrinkage or distortion of the molded products. In order to prevent the increased connection loss of the molded components, there is a demand for a method of inspecting the positions of the fiber accommodating holes 13 with respect to those of the guide projections 10. It is required for such a method of performing an inspection in a short period of time to obtain accurate inspection result.

Figure 13:
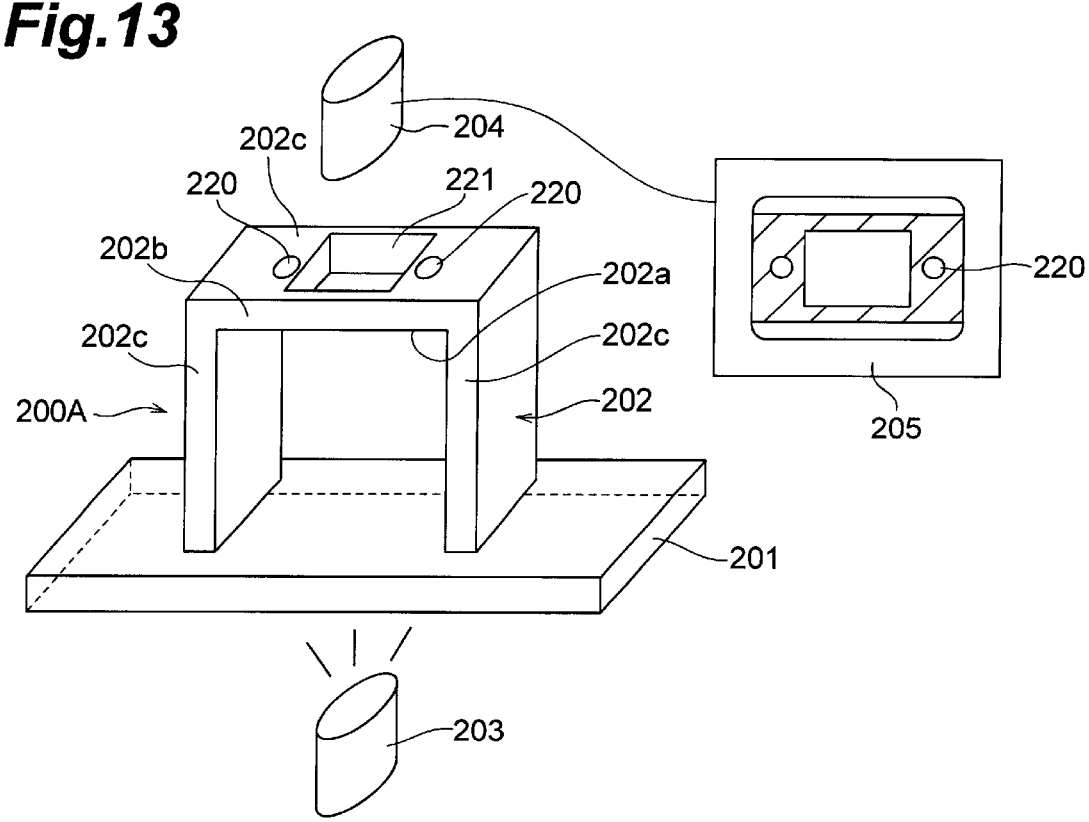
FIG. 13 is a view showing a step in inspecting the ferrule of FIG. 1.

FIG. 13 shows an inspection system that can be used to inspect the ferrule 1A. An inspection system 200A has a stage 201, jig 202, light source 203, image sensing means such as a CCD camera 204, and image processing means 205.

The jig 202 has a positioning portion 202b such as a flat board having a reference surface 202a which the mating surface 11 of the ferrule 1A can face. The positioning portion 202b is secured to the stage 201 through a pair of support portions 202d. In the positioning portion 202b, a pair of positioning holes 220 are disposed. The pair of positioning holes 220 extend from the reference surface 202a to a surface 202c opposed to the reference surface 202a. The pair of positioning holes 220 are arranged with an interval and diameter determined to correspond to the positions of the pair of guide projections 10. A rectangular window 221 is disposed between the pair of positioning holes 220. The window 221 is positioned such that the optical fiber accommodating holes 13 appear in the window 221 when the guide projections 10 of the ferrule 1A are inserted into the positioning holes 220 of the jig 201, so that the mating surface 11 faces the reference surface 202a.

The inspection system 200A also has the light source 203 disposed so as to be faced to the reference surface 202a. The reference surface 202a is disposed between the light source 203 and an image acquisition means such as the CCD camera 204. The image acquisition means detects light from the light source 203. The light source 203 can be disposed between the stage 201 and positioning portion 202a. Alternatively, the stage 210 can be disposed between the light source 203 and the positioning portion 202a. In this case, the stage 201 is preferably made of transparent material such as glass. The image processing means 205 processes images captured by the CCD camera 204 to display them on a monitor. An optical microscope may be used in place of a camera or CCD camera 204.

An inspection procedure using the inspection system 200A will be described.

Before the ferrule 1A is mounted on the jig 202, the position data of the positioning holes 220 is acquired through the CCD camera 204. The position data of the positioning holes 220 is acquired as follows. As shown in FIG. 13, the light source 203 is used to project light on the reference surface 202a. The CCD camera 204 receives the light that has passed through the pair of positioning holes 220 and window 221. The resultant image is processed to store the position data of the pair of the positioning holes 220 in the image processing means 205.

Figure 14:
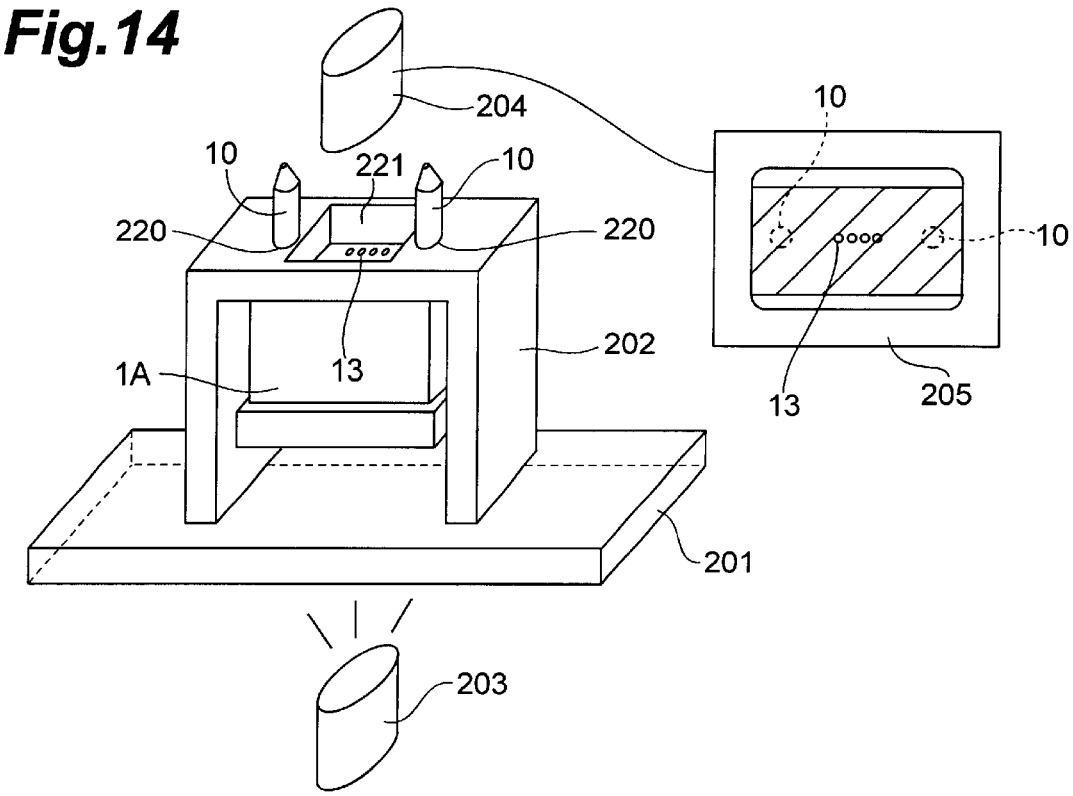
FIG. 14 is a view showing a step in inspecting the ferrule of FIG. 1.

The guide projections 10 are inserted into the positioning holes 220 to secure the ferrule 1A to the jig 202. As a result, the pair of guide projections 10 are positioned in the positioning holes 220. No light, therefore, can pass through the positioning holes 220. The position data of the fiber positioning holes 13 is then acquired. The position data of the fiber positioning holes 13 is acquired as follows. As shown in FIG. 14, the ferrule 1A is irradiated with light from the light source 203. The light that passes through the optical fiber accommodating holes 13 reaches the mating surface 11. The CCD camera 204 receives this light through the window 221. On the basis of the received image, the image processing means 205 calculates data on the number and positions of optical fiber accommodating holes. This image data is displayed on the monitor 205 such that the positions of the positioning holes 220 are superimposed on those of the optical fiber accommodating holes 13. FIG. 14 indicates the positions of the guide projections 10 in dashed lines.

The positions of the positioning holes 220 and fiber accommodating holes 13 can be converted into coordinates by arithmetically processing the image from the CCD camera 204 through edge detection technique. Alternatively, the distances between the displayed respective holes can be measured on the monitor 205.

On the basis of the acquired positions of the positioning holes 220, i.e., the positions of the guide projections 10, and the acquired positions of the fiber accommodating holes 13, a determination as to whether the fiber positioning holes 13 are accurately positioned to the guide projections 10 is made.

Figure 16:
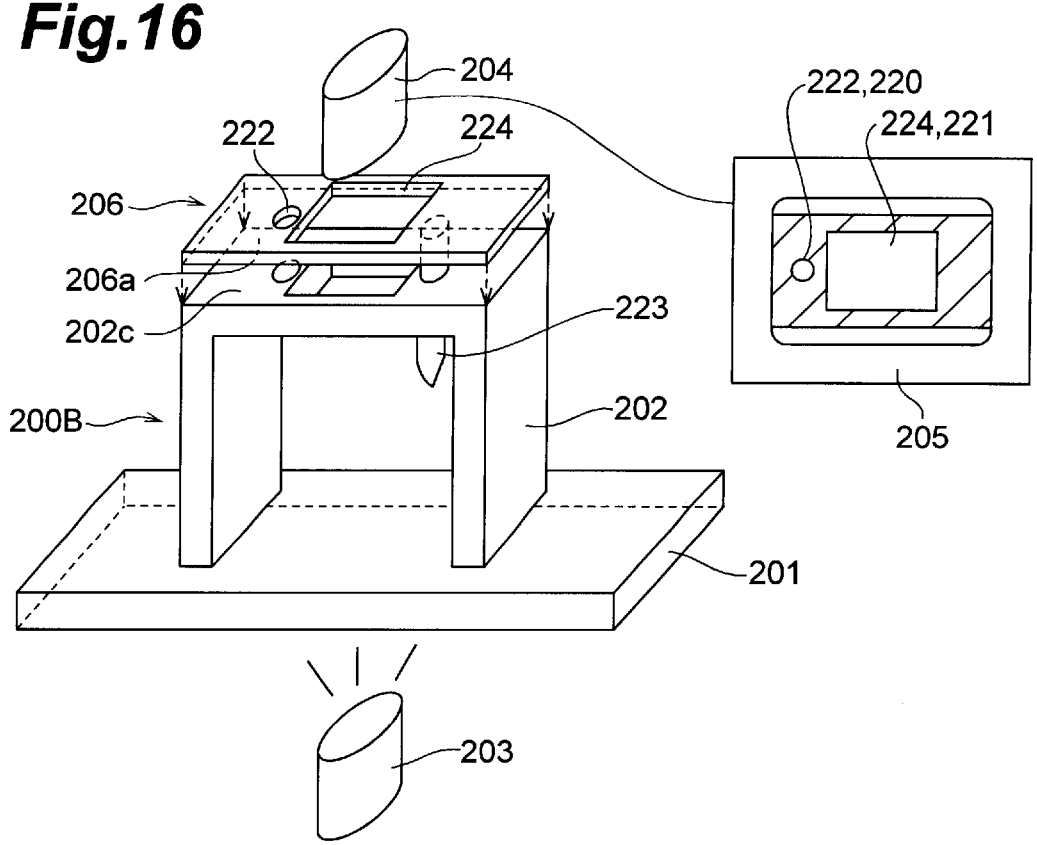
FIG. 16 is a view showing a step in inspecting the ferrule of FIG. 4A.

FIG. 16 shows an inspection system that can be used to inspect the ferrule 1C. In addition to the components of the inspection system 200A, an inspection system 200B has an auxiliary jig 206. Components other than the auxiliary jig 206 are the same as those of the inspection system 200A.

The auxiliary jig 206 has a rectangular reference surface 206a. The auxiliary jig 206 is mounted on a jig 202 such that the reference surface 206a feces a surface 202c opposed to the reference surface 202a of the jig 202. On the reference surface 206a, the auxiliary jig 206 has a positioning projection 223, positioning hole 222 extending in the same direction as the positioning projection 223, and a window 224 disposed between the positioning projection 223 and positioning hole 222. When the positioning projection 223 is inserted into one of a pair of positioning holes 220 to combine the jig 206 with the jig 202 together, the positioning projection 223 can be used to position the guide hole 52 of the ferrule 1C to the jigs 202 and 206 combined together. The window 224 is disposed to overlap the window 221 when the jigs 206 and 202 are combined together.

The guide projection 50 of the ferrule 1C is inserted into the positioning holes 220 and 222 of the combined jigs 202 and 206, and the positioning projection 223 is inserted into the guide hole 52 of the ferrule 1C. As a consequence, the ferrule 1C is positioned to the combined jigs 202 and 206.

An inspection procedure using the inspection system 200B will be described below.

Figure 15:
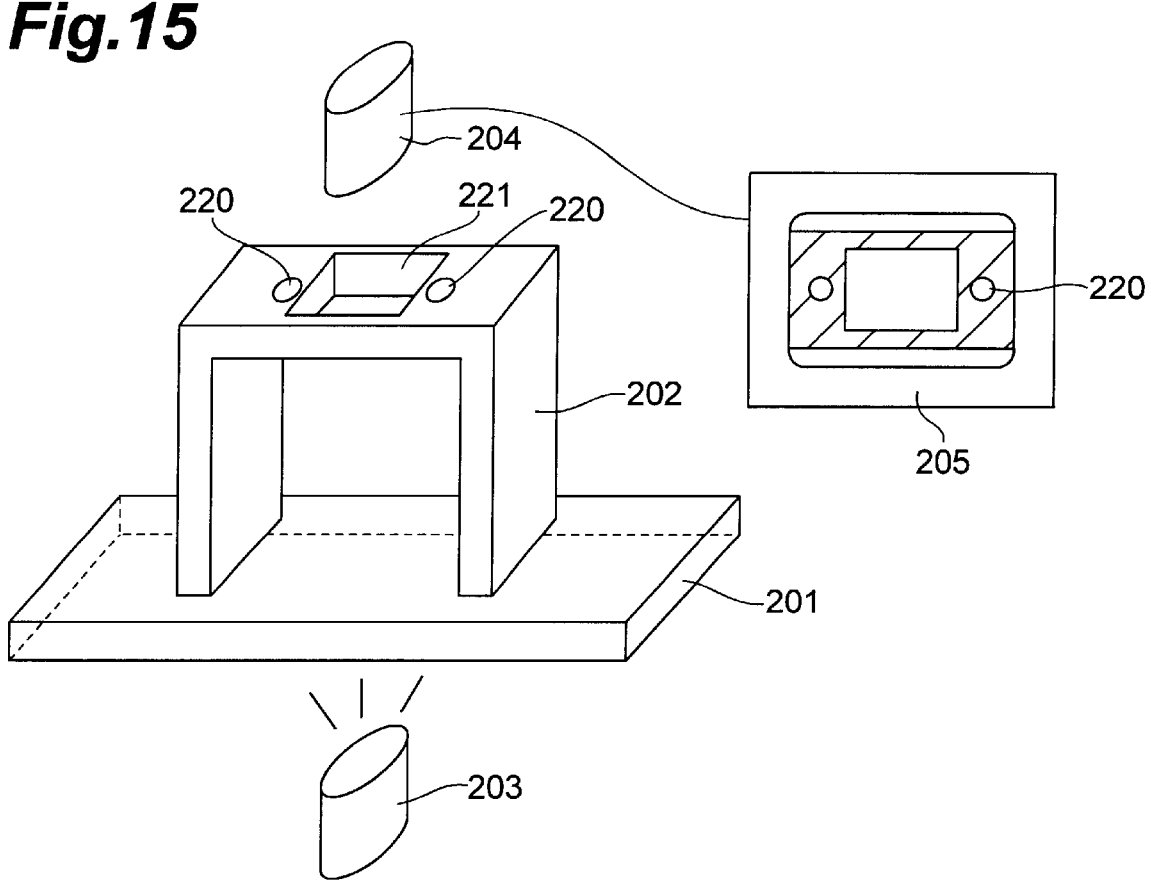
FIG. 15 is a view showing a step in inspecting the ferrule of FIG. 4A.

In the inspection system 200B in FIG. 16, the position data of the positioning holes 220 is acquired through a CCD camera 204 as shown in FIG. 15 before the jig 206 and ferrule 1C are mounted on the jig 202 in the same manner as the ferrule 1A.

The positioning projection 223 of the additional jig 206 is inserted into one of the pair of positioning holes 220 to mount the auxiliary jig 206 on the jig 202, such that the window 224 overlaps the window 221 and the positioning hole 222 overlaps the positioning hole 220. The positioning holes 220 and 222 and positioning projection 223 of the combined jigs 202 and 206 can be used to position the projection 50 to the guide hole 52 of the ferrule 1C.

Figure 17:
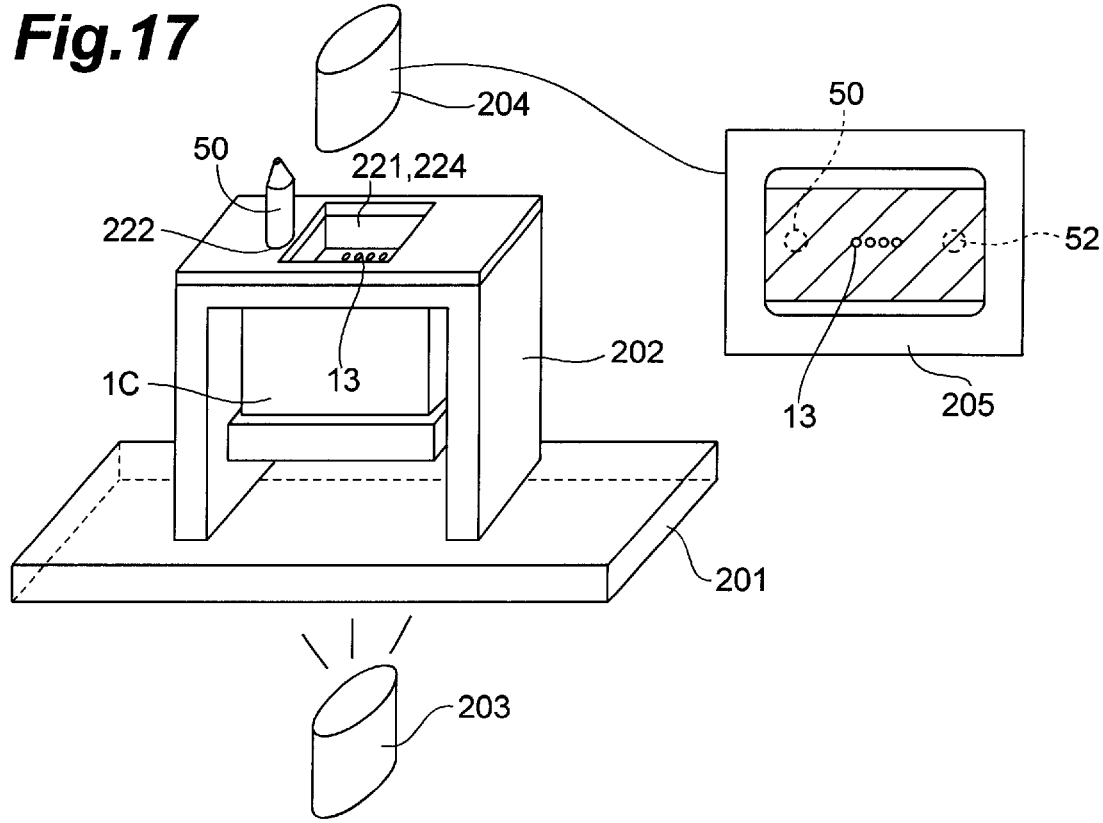
FIG. 17 is a view showing a step in inspecting the ferrule of FIG. 4A.

As shown in FIG. 17, the ferrule 1C is mounted to the jigs 202 and 206 by inserting the guide projection 50 into the positioning holes 220 and 222 and inserting the positioning projection 223 into the guide hole 52. As a result, the guide projection 50 and guide hole 52 of the ferrule 1C are positioned to the positioning hole 220 and positioning projection 223.

The position data of the fiber accommodating holes 13 is acquired as follows. As shown in FIG. 17, the ferrule 1C is irradiated with light from a light source 203. The light passes through the optical fiber accommodating holes 13 to reach the mating surface 11. The CCD camera 204 receives this light through the window 221. The received image is processed in the same manner as in the inspection system 200A. On the basis of this result, a determination as to whether the fiber accommodating holes 13 are accurately displsed to the guide projection 50 is made. Referring to FIG. 17, the dashed lines indicate the positions of the guide projection 50 and guide hole 52.

The inspection methods above allow the following: for of the ferrule 1A, the accurate determination as to the position data of the optical fiber accommodating holes 13 with respect to the guide projections 10; and for the ferrule 1C, the position data of the fiber accommodating holes 13 with respect to the guide projection 50 and guide hole 52. If this position data is used to screen the molded products, the ferrules 1A and 1C with good transmission performance can be selected from the molded products. Since this inspection needs only a short period of inspection time for each individual molded product, all molded products can be screened with this inspection. Nevertheless, the inspection can be applied for only a number of samples suitable for quality control, which are extracted in lots of molded products.

The ferrules and molds according to the present invention are not limited to those in the above embodiments. For example, the ferrule 1A in the above embodiment is applied to form a so-called MT connector, but may be incorporated in an MPO connector to form a component of the push-pull type MPO connector. Although the ferrule 1A is molded by injection molding with the molding resin above, obviously, the ferrule can be also molded by transfer molding with epoxy resin.

If there is no disadvantage in terms of the releasability above, guide projections 10 having no tapered surfaces on their distal and proximal end portions can be applied to the ferrules. As described in the embodiment, in the cylindrical portion 116, the inner surface coated with chromium nitride and the tapering angle a can be employed. However, if there is no disadvantage in the releasability, only chromium nitride coating may be used, or only the tapering angle a may be used without chromium nitride coating.

The above inspection methods are not limited to those of the embodiments. For example, as described in the embodiments, the position data of the positioning holes 220 (the positions of the guide projections 10) are acquired in advance through transmitted light prior to the acquisition of the position data of the fiber accommodating holes 13. The position data of the positioning holes 220 may be, however, acquired after the position data of the fiber accommodating holes 13 is acquired in advance through transmitted light. The inspection result is independent of the acquisition order of the position data of the positioning holes 220 and fiber accommodating holes 13. In addition, if the positions of the jig 202 are fixed to the positions of the CCD camera 204, the position data of the positioning holes 220 need not be acquired for every ferrule. Therefore, after the positions of the positioning holes and fiber accommodating holes are measured separately using transmitted light, the positions of the fiber accommodating holes relative to the positioning holes are inspected.

Figure 19:
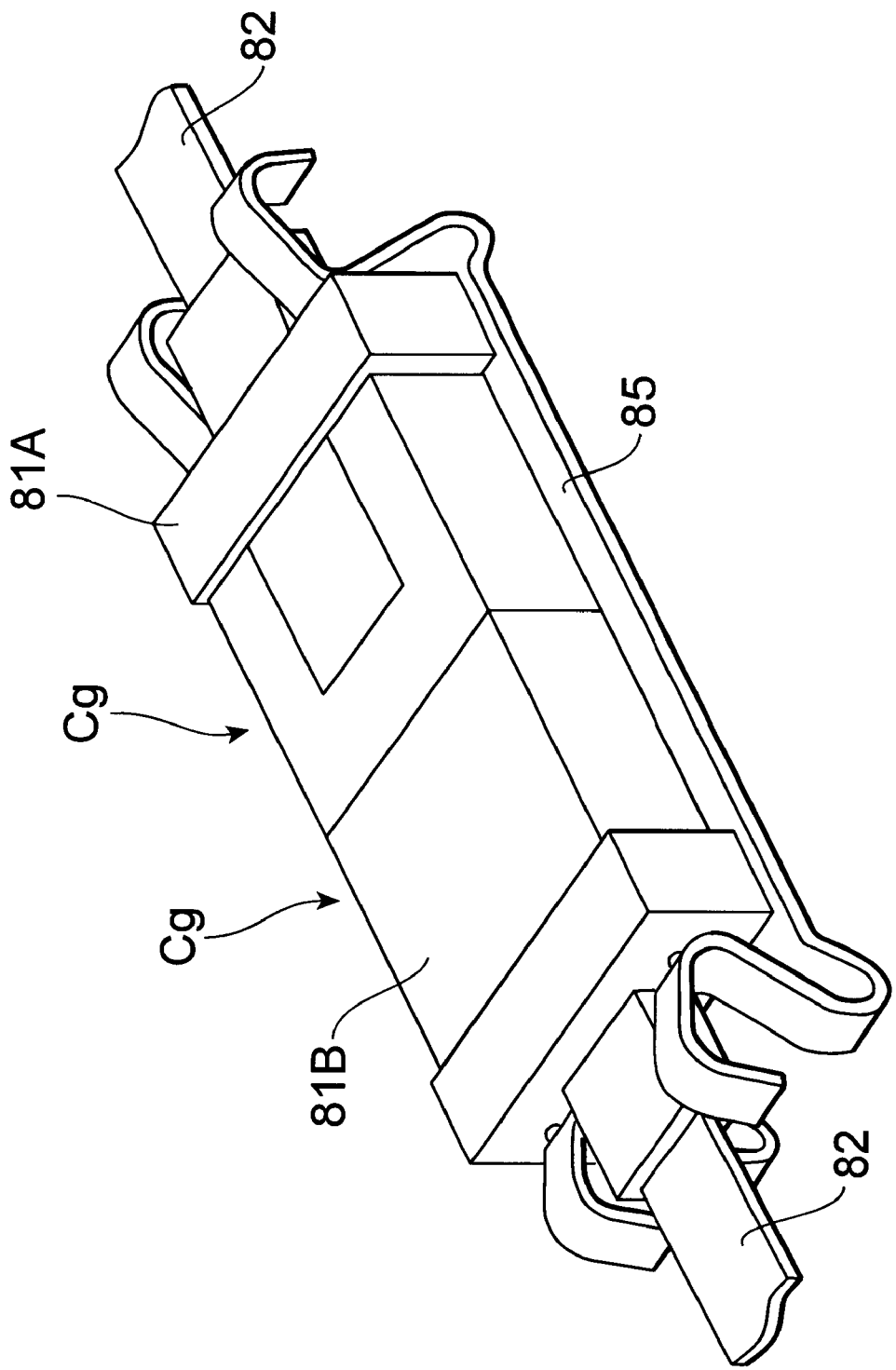
FIG. 19 is a perspective view showing optical connector ferrules connected to each other.

The present inventor also found the following problems on the course of studying the optical connectors in FIGS. 18 and 19. The present inventor paid attention to the fact that guide pins 83 come into contact with the peripheries of the opening portions of holes 92 during and after the insertion of the guide pins 83 into the holes 92. When a resin ferrule 81B is used, the hardness of the guide pins 83 is higher than that of the ferrule 81B. The present inventor found that the opening portions of the holes 92 were likely to wear upon repetitive detachment/attachment of the guide pins 83 because the guide pins 83 and holes 92, which greatly differed in hardness, came into contact with each other repeatedly. If the positioning precision gradually decreases owing to the repetitive detachment/attachment, the high-speed transmission characteristics may be impaired.

The present inventor thinks that metal guide pins may wear the ferrule of optical connectors such as MPO connectors, which are designed to perform positioning by guide pins as well as in the MT connectors shown in FIGS. 18 and 19.

In addition, since the guide pins 83 and ferrule 1B, which are made of different materials, differ in dimensional variations with time, gaps may arise between the guide pins 83 and holes 92 due to the dimensional variation, resulting in the deteriorated transmission characteristics. Furthermore, since it is not easy to insert the guide pins 83 into the holes 92, extreme caution must be taken for the insertion to prevent damage to the ferrule 1B. There was, therefore, a demand for ferrules allowing more quick insertion.

The ferrules described above also solve these problems, and have the following additional advantages.

According to the method of manufacturing ferrules, since the inner surfaces of cylindrical portions for forming guide projections are coated with chromium nitride. This improves the releasability of releasing a positioning projection of a molded ferrule. This makes it possible to suffer less damage to the positioning projection in the releasing process. In addition to the suppression of the damage, the chromium nitride coating also contributes to maintenance of the high dimensional accuracy of the positioning projection. This makes it possible to manufacture ferrules with good connection characteristics.

As has been described in detail, since the guide projections and guide holes are integrally formed with the ferrule, the connection precision of the connectors is defined by the guide projections and guide holes. If the positional offsets between the guide projections and guide holes and the optical fiber accommodating holes are suppressed to less than a predetermined value by the inspection, this precision can be maintained even after the integrally molded ferrule is assembled into an optical connector is not determined by the assembly of the optical connector but is determined by the molding precision of the ferrule itself. According to the ferrules according to the present invention, the coupling precision of optical connectors can be, therefore, improved by molding the ferrules with high precision. This is a characteristic feature.

INDUSTRIAL APPLICABILITY

According to the optical connector ferrule of the present invention, the guide projections and guide engaging portions extend continuously from the mating surface of the ferrule along a predetermined axis so as to be used for positioning with respect to an optical connector to be connected. In addition, since the optical fiber accommodating holes, first guide projections, and guide engaging portions are formed as a integral component made of the same material, the optical connector with this ferrule does not include any additional component made of different material, e.g., metal guide pins. For this reason, no stress due to temperature changes concentrates on specific part of the ferrule. In addition, the stresses caused by changes in temperature are dispersed in the whole ferrule.

Since the ferrule is an integral resin component, any portion of the ferrule has the same thermal expansion coefficient. This improves the positioning precision of optical connector accommodating holes with temperature changes.

There is, therefore, provided an optical connector ferrule that can form an optical connector with good transmission performance. In addition, this reduces the cost of manufacturing a ferrule. This also simplifies the assembly of the optical connector.

According to the mold of the present invention, a resin ferrule including a pair of guide projection, guide projections, and guide holes can be integrally molded.

According to the method of manufacturing the ferrule of the present invention, the method allows the integral molding of resin ferrules having optical fiber accommodating holes accurately positioned to guide projections and guide engaging portions and also allows the screening of the ferrules.

According to the method of inspecting the ferrule of the present invention, in an integrally resin-molded ferrule including a pair of guide projections, guide projections, and guide holes, this method allows the accurate inspection of the positions of fiber accommodating holes relative to the pair of guide projections and the guide projection and guide hole. This makes it possible to screen ferrules having good transmission characteristics.

What is claimed is:

1. An optical connector ferrule comprising:
   a mating surface made of resin;
   an optical fiber accommodating hole having an inner surface and one end portion, said inner surface extending along a predetermined plane and being made of the resin, and one end portion reaching said mating surface;
   a first guide projection having proximal and distal end portions, said first guide projection continuously extending from said mating surface along the predetermined plane, and said first guide projection being made of the resin; and
   a guide engaging portion continuously extending from said mating surface along the predetermined plane, said guide engaging portion made of the resin;
   wherein said mating surface, said optical fiber accommodating hole, said guide projection and said guide engaging portion are integrally formed.

2. A ferrule according to claim 1, wherein said guide engaging portion includes a second guide projection having proximal and distal end portions, said second guide projection continuously extending from said mating surface along the predetermined plane, and said second guide projection being made of the resin.

3. A ferrule according to claim 2, wherein the proximal end portion of each of said first and second guide projections has a cross-section area gradually increasing along the predetermined axis toward said mating surface.

4. A ferrule according to claim 2, wherein each of said first and second guide projections has a substantially circular cross-section.

5. A ferrule according to claim 1, wherein said guide engaging portion includes a guide hole having an opening portion, a distal end portion, and an inner surface, said opening portion being provided on said mating surface, said inner surface being made of the resin, and said guide hole extending along the predetermined plane.

6. A ferrule according to claim 5, wherein the inner surface of said guide hole includes a tapered surface, said first tapered surface being provided on said opening portion of said guide hole, and said first tapered surface decreasing in cross-section inwardly from said opening portion.

7. A ferrule according to claim 5, wherein said guide hole has a substantially circular cross-section.

8. A ferrule according to claim 5, wherein said first guide projection has a tapered surface, said tapered surface being provided on at least one of the proximal and distal end portions, and said tapered surface decreasing in cross-section in a direction away from the mating surface.

9. A ferrule according to claim 5, wherein the proximal end portion of said first guide projection has a cross-section gradually increasing along the predetermined axis toward said mating surface.

10. A ferrule according to claim 5, wherein the inner surface of said guide hole has a tapered surface, said tapered surface being provided on the opening portion of said guide hole, and said tapered surface decreasing in cross-section inwardly from said opening portion;
    wherein a tilt angle of the tapered surface is associated with a tapered surface of a guide projection of a mating ferrule.

11. A ferrule according to claim 5, wherein said first guide projection has a substantially circular cross-section.

12. A ferrule according to claim 1, wherein the resin includes PPS resin containing 39 to 65 wt % of silica particle filler and 26 to 35 wt % of silicate whisker filler with a total content of the silica particle filler and silicate whisker filler being 65 to 85 wt %.

13. A ferrule according to claim 1, wherein said optical fiber accommodating hole is provided between said first projection and said engaging portion.

14. A ferrule according to any one of claim 1, further comprising one or more additional optical fiber accommodating holes, each having an inner surface extending along the predetermined axis and being made of the resin.

* * * * *